(12) United States Patent
Tinnakornsrisuphap et al.

(10) Patent No.: US 8,743,858 B2
(45) Date of Patent: Jun. 3, 2014

(54) WIRELESS COMMUNICATION SYSTEMS WITH FEMTO CELLS

(75) Inventors: Peerapol Tinnakornsrisuphap, San Diego, CA (US); Sanjiv Nanda, Ramona, CA (US); Manoj M. Deshpande, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 12/502,092

(22) Filed: Jul. 13, 2009

(65) Prior Publication Data

US 2010/0040038 A1    Feb. 18, 2010

Related U.S. Application Data

(60) Provisional application No. 61/081,006, filed on Jul. 15, 2008.

(51) Int. Cl.
*H04J 3/00* (2006.01)

(52) U.S. Cl.
USPC ............ 370/345; 370/329; 370/342; 370/347

(58) Field of Classification Search
USPC .................. 370/345, 342, 329, 337, 331; 455/456.1, 456.2, 438, 436
See application file for complete search history.

(56) References Cited

U.S. PATENT DOCUMENTS

| | | | |
|---|---|---|---|
| 5,345,467 A | 9/1994 | Lomp et al. | |
| 5,673,259 A | 9/1997 | Quick, Jr. | |
| 5,722,073 A | 2/1998 | Wallstedt et al. | |
| 6,032,047 A | 2/2000 | Cerwall et al. | |
| 6,044,272 A | 3/2000 | Kobylinski et al. | |
| 6,201,969 B1 | 3/2001 | Meier | |
| 6,285,874 B1 | 9/2001 | Magnusson et al. | |
| 6,353,602 B1 | 3/2002 | Cheng et al. | |
| 6,522,881 B1 | 2/2003 | Feder et al. | |
| 6,553,230 B1 * | 4/2003 | Plestid et al. | 455/436 |
| 6,597,671 B1 | 7/2003 | Ahmadi et al. | |
| 6,615,050 B1 * | 9/2003 | Tiedemann et al. | 455/522 |
| 6,680,920 B1 * | 1/2004 | Wan | 370/311 |
| 6,873,612 B1 * | 3/2005 | Steer et al. | 370/342 |

(Continued)

FOREIGN PATENT DOCUMENTS

| | | |
|---|---|---|
| CN | 1568043 A | 1/2005 |
| CN | 1934884 A | 3/2007 |

(Continued)

OTHER PUBLICATIONS

International Search Report and Written Opinion—PCT/US2009/050585, International Search Authority—European Patent Office—Nov. 19, 2009.

(Continued)

*Primary Examiner* — Rasheed Gidado

(57) ABSTRACT

Systems and methods of uniquely identifying communication nodes in a wireless communication system are described herein. One embodiment of the disclosure provides a wireless apparatus comprising a transceiver configured to receive a first identifier during at least one time slot. The first identifier identifies a first communication node. The apparatus further comprises a processing circuit configured to determine if the first identifier is received during a first time slot that is different from at least one pre-assigned time slot.

31 Claims, 15 Drawing Sheets

(56) References Cited

U.S. PATENT DOCUMENTS

| | | | |
|---|---|---|---|
| 7,310,518 B2 | 12/2007 | Chambers | |
| 7,596,378 B1 | 9/2009 | Nizri et al. | |
| 7,813,320 B2 | 10/2010 | Kim et al. | |
| 7,876,729 B1 | 1/2011 | Grilli et al. | |
| 8,027,681 B2 | 9/2011 | Burgess et al. | |
| 8,400,979 B2 | 3/2013 | Smee et al. | |
| 2001/0000136 A1* | 4/2001 | Dixon et al. | 370/342 |
| 2004/0063428 A1 | 4/2004 | Jansson | |
| 2004/0138807 A1 | 7/2004 | Jha et al. | |
| 2004/0240474 A1 | 12/2004 | Fan | |
| 2005/0030924 A1 | 2/2005 | Yano et al. | |
| 2005/0048922 A1 | 3/2005 | Lee et al. | |
| 2005/0148368 A1 | 7/2005 | Scheinert et al. | |
| 2005/0243772 A1 | 11/2005 | Lee et al. | |
| 2006/0056351 A1 | 3/2006 | Wall | |
| 2006/0098752 A1 | 5/2006 | Song et al. | |
| 2006/0172707 A1 | 8/2006 | Stern-Berkowitz et al. | |
| 2006/0234713 A1 | 10/2006 | Oswal et al. | |
| 2006/0280141 A1* | 12/2006 | McBeath et al. | 370/329 |
| 2007/0097897 A1 | 5/2007 | Teague et al. | |
| 2007/0097914 A1 | 5/2007 | Grilli et al. | |
| 2007/0097938 A1 | 5/2007 | Nylander et al. | |
| 2007/0097939 A1 | 5/2007 | Nylander et al. | |
| 2007/0135147 A1 | 6/2007 | DeClerck et al. | |
| 2007/0153728 A1 | 7/2007 | Le et al. | |
| 2007/0213086 A1 | 9/2007 | Claussen et al. | |
| 2007/0287501 A1 | 12/2007 | Hoshina et al. | |
| 2007/0291699 A1 | 12/2007 | Lee et al. | |
| 2007/0291728 A1 | 12/2007 | Dalsgaard et al. | |
| 2007/0298803 A1 | 12/2007 | Kawabata et al. | |
| 2008/0132239 A1* | 6/2008 | Khetawat et al. | 455/438 |
| 2008/0146226 A1 | 6/2008 | Claussen et al. | |
| 2008/0153497 A1 | 6/2008 | Kalhan | |
| 2008/0159222 A1 | 7/2008 | Akram et al. | |
| 2008/0207207 A1 | 8/2008 | Moe et al. | |
| 2008/0227458 A1 | 9/2008 | Wu | |
| 2009/0016314 A1* | 1/2009 | Kim | 370/345 |
| 2009/0047955 A1 | 2/2009 | Frenger et al. | |
| 2009/0052395 A1 | 2/2009 | Bao et al. | |
| 2009/0092107 A1 | 4/2009 | Cai et al. | |
| 2009/0093252 A1 | 4/2009 | Czaja et al. | |
| 2009/0097448 A1 | 4/2009 | Vasudevan et al. | |
| 2009/0132674 A1 | 5/2009 | Horn et al. | |
| 2009/0132675 A1 | 5/2009 | Horn et al. | |
| 2009/0168745 A1 | 7/2009 | Ahmadi et al. | |
| 2009/0176490 A1 | 7/2009 | Kazmi et al. | |
| 2009/0196253 A1 | 8/2009 | Semper | |
| 2009/0219888 A1 | 9/2009 | Chen et al. | |
| 2009/0233607 A1 | 9/2009 | Claussen et al. | |
| 2009/0270097 A1 | 10/2009 | Gallagher et al. | |
| 2009/0275333 A1 | 11/2009 | Ishii et al. | |
| 2009/0280819 A1 | 11/2009 | Brisebois et al. | |
| 2009/0298515 A1 | 12/2009 | Czaja et al. | |
| 2009/0316654 A1 | 12/2009 | Prakash et al. | |
| 2009/0316655 A1 | 12/2009 | Prakash et al. | |
| 2010/0040019 A1 | 2/2010 | Tinnakornsrisuphap et al. | |
| 2010/0130199 A1 | 5/2010 | Piercy et al. | |
| 2010/0260068 A1 | 10/2010 | Bhatt et al. | |
| 2011/0014920 A1 | 1/2011 | Nylander et al. | |
| 2011/0051658 A1 | 3/2011 | Jin et al. | |
| 2011/0263274 A1 | 10/2011 | Fox et al. | |

FOREIGN PATENT DOCUMENTS

| | | |
|---|---|---|
| EP | 1928194 A1 | 6/2008 |
| EP | 2079263 A1 | 7/2009 |
| JP | 2000312379 A | 11/2000 |
| JP | 2002525913 A | 8/2002 |
| JP | 2003219459 A | 7/2003 |
| JP | 2004140459 A | 5/2004 |
| JP | 2006141031 A | 6/2006 |
| JP | 2008005074 A | 1/2008 |
| JP | 2008053870 A | 3/2008 |
| JP | 2008118227 A | 5/2008 |
| JP | 2010500793 A | 1/2010 |
| JP | 2010514352 A | 4/2010 |
| JP | 2010517366 A | 5/2010 |
| KR | 20060128694 A | 12/2006 |
| KR | 20070051954 A | 5/2007 |
| KR | 100777096 B1 | 11/2007 |
| RU | 2209528 C2 | 7/2003 |
| RU | 2316894 C2 | 2/2008 |
| RU | 2341900 C2 | 12/2008 |
| TW | 200820809 A | 5/2008 |
| WO | 9839940 | 9/1998 |
| WO | 0016518 A2 | 3/2000 |
| WO | 0243430 A1 | 5/2002 |
| WO | 2004010607 A1 | 1/2004 |
| WO | WO-2004114695 A1 | 12/2004 |
| WO | 2005029894 A1 | 3/2005 |
| WO | 2005078966 A1 | 8/2005 |
| WO | 2005107169 A1 | 11/2005 |
| WO | WO2007010304 | 1/2007 |
| WO | WO2007103062 A1 | 9/2007 |
| WO | 2007113154 A1 | 10/2007 |
| WO | 2008019557 A1 | 2/2008 |
| WO | WO2008055251 | 5/2008 |
| WO | WO2008073554 | 6/2008 |
| WO | WO2008076222 | 6/2008 |
| WO | WO2008094333 A1 | 8/2008 |
| WO | 2008104196 | 9/2008 |
| WO | WO2009064647 | 5/2009 |
| WO | WO2009067454 | 5/2009 |

OTHER PUBLICATIONS

International Search Report and Written Opinion—PCT/US2009/050586, International Search Authority—European Patent Office—Nov. 25, 2009.
Search Authority—European Patent Office—Nov. 25, 2009.
Telecom Italia, et al., "Way forward for handover to HeNB" 3GPP Draft; R2-084534, 3rd Generation Partnership Project (3GPP), Mobile Competence Centre ; 650, Route Des Lucioles ; F-06921 Sophia-Antipolis Cedex ; France, No. Jeju; Aug. 12, 2008.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300,3rd Generation Partnership Project (3GPP), Mobile Competence Centre ; 650, Route Des Lucioles ; F-06921 Sophiaantipoliscedex ; France, No. V8.4.0, Mar. 1, 2008, pp. 1-126, XP050377579.
"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.
Ericsson: "Automatic neighbour cell configuration", 3GPP Draft; S5-071484, 3rd Generation Partnership Project (3GPP), Mobile Competence Centre; Sophia-Antipolis Cedex ; France, (Aug. 2007), XP050306143, paragraph 3.4.
Ericsson: "MCI conflict detection and resolution", 3GPP Draft; S5-071569, 3rd Generation Partnership Project (3GPP), Mobile Competence Centre; Sophia-Antipolis Cedex; France, XP050306211, (Aug. 2007).
Huawei: "Detection of conflicting cell identities," 3GPP Draft; R3-071947, 3rd Generation Partnership Project (3GPP), Mobile Competence Centre; Sophia-Anti Polis Cedex ; France , XP050162733 [retrieved on Oct. 3, 2007] the whole document, (Oct. 3, 2007).
Huawei, "Detection of conflicting cell identities", 3GPP TSG-RAN-WG2 Meeting #59bis, R2-074216, Oct. 2007, p. 1-p. 3, URL:http://www.3gpp.org/ftp/tsg_ran/WG2_RL2/TSGR2_59bis/Docs/R2-074216.zip.
Panasonic: "UE access control in CSG cell," 3GPP Draft; R2-082238, 3rd Generation Partnership Project (3GPP), Kansas City, USA, XP050140005, figures 1-3 paragraph [2.1]-paragraph [2.3], (Apr. 29, 2008).

(56) References Cited

OTHER PUBLICATIONS

Qualcomm Europe and T-Mobile: "Inter-RAT/frequency Automatic Neighbour Relation Function," 3GPP Draft TSG RAN#60; R2-074907, 3rd Generation Partnership Project (3GPP), Jeju, South Korea, XP050137407 figure 1 p. 2-p. 3, (Nov. 5-9, 2007).

Qualcomm Europe: "Connected mode mobility in the presence of PCI confusion", 3GPP Draft; R3-090699, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, XP050341086, [retrieved on Mar. 18, 2009].

Qualcomm Europe (Email Rapporteur): "Summary of email discussion on Home eNB inbound mobility support [61b-LTE-B06]," 3GPP Draft TSG-RAN WG 2 meeting #62; R2-082270, 3rd Generation Partnership Project (3GPP), Kansas City, USA, XP050140027, (Apr. 29, 2008).

Qualcomm Europe et al.,"Network based solutions to inbound mobility in the presence of PCI confusion", 3GPP Draft; R3-091378, 3rd Generation Partnership Project (3GPP), Mobile Competence Centre; 650, Route Des Lucioles ; F-06921 Sophia-Antipolis Cedex ; France, No. San Francisco, USA; May 4, 2009, XP050341712, [retrieved on May 4, 2009].

Qualcomm Europe, "Optimized handover in the presence of PCI confusion", 3GPP Draft,R2-083268,3rd Generation Partnership Project (3GPP), Mobile Competence Centre,650,Route Des Lucioles, F-06921 Sophia-Antipolis Cedex ,France, vol. RAN WG2, No. Warsaw, Poland, Jun. 24, 2008, XP050140688.

Taiwan Search Report—TW098123799—TIPO Feb. 18, 2013.

Tinnakornsrisuphap, P., "Automatic Configuration Support for 1x and HRPD Femto", Qualcomm, A20-20080616-004r0, pp. 1-15, Jun. 2008.

T-Mobile: "Automatic Neighbour Cell List Configuration-required Measurement and Signalling support, Templates according to R3-071730," 3GPP DraftTSG-RAN WG3 Meeting #57bis; R3-071936, 3rd Generation Partnership Project (3GPP), Sophia Antipolis, France, XP050162723, pp. 2-4, (Oct. 3, 2007).

ZTE: "Generation of Neighbour Relations", 3GPP Draft; R3-080077, 3rd Generation Partnership Project (3GPP), Mobile Competence Centre; 650, Route Des Lucioles; F-06921 Sophia-Antipolis Cedex; France, vol. RAN WG3, No. Sorrento, Italy; Feb. 5, 2008, XP050163310 [retrieved on Feb. 5, 2008] p. 1, line 23-p. 3, line 3.

\* cited by examiner

WIRELESS COMMUNICATION SYSTEMS WITH FEMTO CELLS

CROSS REFERENCE TO RELATED APPLICATION(S)

This application claims the benefit of U.S. Provisional Application No. 61/081,006, filed Jul. 15, 2008, the entire content of which is incorporated herein by reference.

BACKGROUND

1. Field of the Invention

The present application relates generally to wireless communications, and more specifically to systems and methods to configure femto nodes.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. These femto nodes, however, may interfere with each other. Adjusting the method in which femto nodes communicate to minimize interference may be desirable.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description of the Preferred Embodiments" one will understand how the features of this invention provide advantages that include concurrent communication over multiple air interfaces.

One embodiment of the disclosure provides a wireless apparatus comprising a transceiver configured to receive a first identifier during at least one time slot. The first identifier identifies a first communication node. The apparatus further comprises a processing circuit configured to determine if the first identifier is received during a first time slot that is different from at least one pre-assigned time slot.

A further embodiment of the disclosure provides a method of uniquely identifying a first communication node and a second communication node in a wireless communication system. The method comprises receiving a first identifier during at least one time slot. The first identifier identifies the first communication node. The method further comprises determining if the first identifier is received during a first time slot that is different from at least one pre-assigned time slot.

Another embodiment of the disclosure provides a wireless apparatus comprising means for receiving a first identifier during at least one time slot. The first identifier identifies the first communication node. The apparatus further comprises means for determining if the first identifier is received during a first time slot that is different from at least one pre-assigned time slot.

Yet another embodiment of this disclosure provides a computer program product, comprising computer-readable medium. The computer-readable medium comprises code for causing a computer to receive a first identifier during at least one time slot. The first identifier identifies the first communication node. The computer-readable medium further comprises code for causing a computer to determine if the first identifier is received during a first time slot that is different from at least one pre-assigned time slot.

DESCRIPTION OF THE PREFERRED EMBODIMENTS

Figure 1:
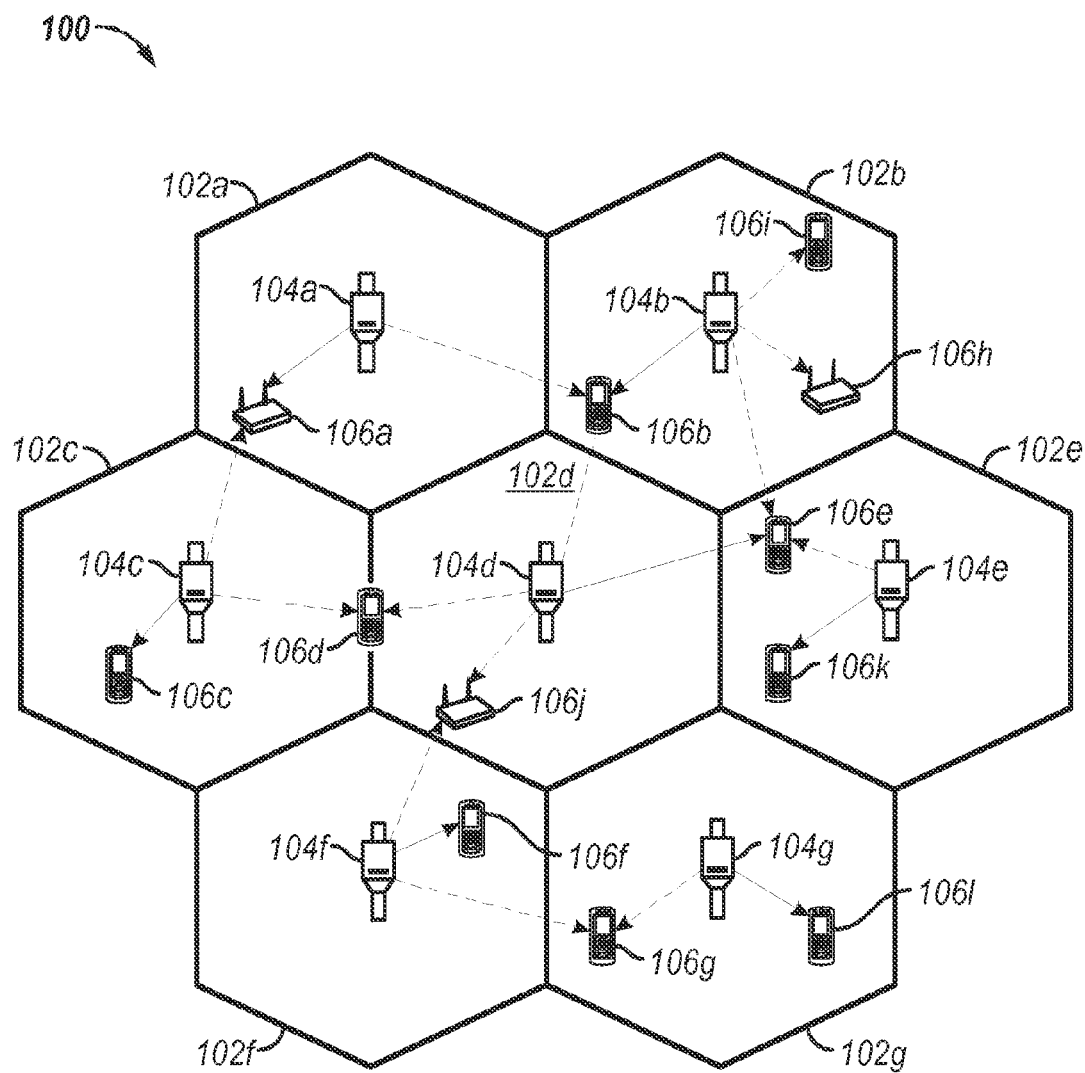
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The nodes 104 may be interconnected, for example, by appropriate wired or wireless interfaces and may be able to communicate with each other. Accordingly, each AT 106 may communicate with another AT 106 through one or more nodes 104. For example, the AT 106j may communicate with the AT 106h as follows. The AT 106j may communicate with the node 104d. The node 104d may then communicate with the node 104b. The node 104b may then communicate with the AT 106h. Accordingly, a communication is established between the AT 106j and the AT 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Figure 2:
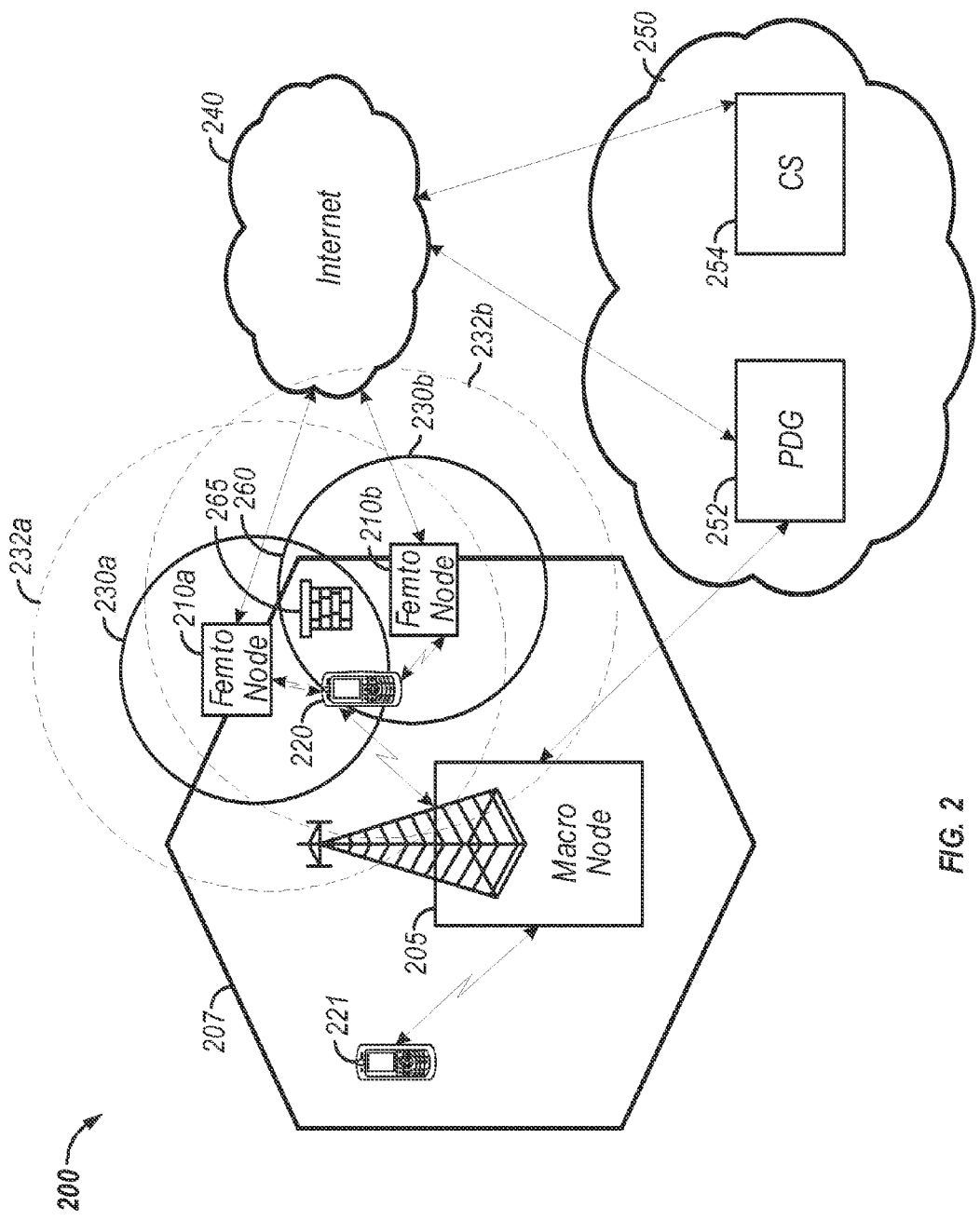
FIG. 2 illustrates the exemplary interoperations of two or more communication networks.

FIG. 2 illustrates exemplary interoperations of two or more communication networks. It may be desirable for an AT 220 to transmit information to and receive information from another AT such as AT 221. FIG. 2 illustrates a manner in which the AT 220 may communicate with the AT 221. As shown in FIG. 2, the macro node 205 may provide communication coverage to access terminals within a macro area 207. For example, the AT 220 may generate and transmit a message to the macro node 205. The message may comprise information related to various types of communication (e.g., voice, data, multimedia services, etc.). The AT 220 may communicate with the macro node 205 via a wireless link.

The macro node 205 may also communicate with a packet data gateway (PDG) (e.g. a mobile switching center and/or a macro femto internetworking function), such as the PDG 252 operating in the communication network 250. For example, the macro node 205 may transmit the message received from the AT 220 to the PDG 252. Generally, the PDG 252 may facilitate communication between the AT 220 and the AT 221 by first receiving the message received from the AT 220 via the macro node 205. The PDG 252 may then transmit the message to the Internet 240 (and/or another appropriate wide area network), for eventual transmission to the AT 221 via a femto node. The macro node 205 and the PDG 252 may communicate via a wired link. For example, a direct wired link may comprise a fiber optic or Ethernet link. The macro node 205 and the PDG 252 may be co-located or deployed in different locations.

Generally, the Internet 240 may facilitate communication between the AT 220 and the AT 221 by first receiving the message from the AT 220 via the macro node 205 and the PDG 252. The Internet 240 may then transmit the message to a femto node, such as the femto node 210b for transmission to the AT 221. The PDG 252 may communicate with the Internet 240 via a wired or wireless link as described above.

The Internet 240 may also communicate with femto nodes, such as the femto nodes 210a, 210b. The femto node 210b may facilitate communication between the AT 220 and the AT 221 by providing communication coverage for the AT 221 within a femto area 230b. For example, the femto node 210b may receive the message originating at the AT 220 via the macro node 205, the PDG 252, and the Internet 240. The femto node 210b may then transmit the message to the AT 221 in the femto area 230b. The femto node 210b may communicate with the AT 221 via a wireless link.

As described above, the macro node 205, the PDG 252, the Internet 240, and the femto node 210b may interoperate to form a communication link between the AT 220 and the AT 221. For example, the AT 220 may transmit generate and transmit the message to the macro node 205. The macro node 205 may then transmit the message to the PDG 252. The PDG 252 may then transmit the message to the Internet 240. The Internet 240 may then transmit the message to the femto node 210b. The femto node 210b may then transmit the message to the AT 221. Similarly, the reverse path may be followed from the AT 221 to the AT 220.

The femto node 210a and/or the femto node 210b may also communicate with a configuration server (CS), such as the CS 254 operating in the communication network 250 via the Internet 240. The CS 254 may communicate with the Internet 240 via a wired or wireless link. The femto nodes 210a, 210b may communicate with the Internet 240 via a wired or wireless link as described above. The CS 254 may be configured to configure attributes (e.g., a pseudo noise (PN) offset) of the femto nodes 210a and/or 210b. In one embodiment, the femto nodes 210a, 210b may be deployed by individual consumers and placed in homes, apartment buildings, office buildings, and the like. The femto nodes 210a, 210b may communicate with the ATs in a predetermined range (e.g., 100 m) of the femto nodes 210a, 210b utilizing a predetermined cellular transmission band. In one embodiment, the femto nodes 210a, 210b may communicate with the Internet 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link. In another embodiment, the femto nodes 210a, 210b may communicate with the PDG 252 via a direct link.

Although the femto nodes 210a, 210b are each configured to communicate with multiple ATs (e.g., ATs 220, 221), a consumer may desire only his or her own traffic to be carried by a private IP connection connected to the femto node 210a and/or the femto node 210b. For example, the consumer may wish to preserve IP bandwidth for their own use, rather than for use by alien ATs. Therefore, the femto nodes 210a, 210b may be configured to allow communication only with a single AT or group of ATs. The choice of which ATs to allow communication with may be determined by the user. Traffic from the allowed ATs to the femto nodes 210a, 210b is then routed over the consumer's IP connection, whereas traffic from other ATs is blocked. Consequently, although the femto nodes 210a, 210b are configured to communicate with any compatible AT, the femto nodes 210a, 210b may be programmed to ignore ATs that are not associated with a particular consumer, service plan, or the like.

Further, in one embodiment, the femto nodes 210a, 210b each may transmit information using an identifier. Accordingly, the AT 220 can distinguish between transmissions sent from multiple femto nodes by using the identifier of each transmission. In one embodiment, the identifier comprises an offset pseudo noise (PN) short code. The offset PN short code may comprise a code or sequence of numbers that identifies the node and/or the node type (e.g., femto node, macro node, pico node). The offset PN short code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein.

In one embodiment, the PN offset may be used to identify the type of node (e.g., femto node, macro node, pico node) transmitting signals. For example, a particular set of PN offsets may be reserved for identifying femto nodes. However, the number of PN offsets available for use may be smaller than the number of femto nodes within a geographic area. Thus the PN offset alone may not be sufficient to uniquely identify a femto node. For example, 512 unique PN offsets may be set aside for use by femto nodes. However, there may be more than 512 femto nodes deployed within the macro area 207. As a result, multiple femto nodes within the macro area 207 may use the same PN offset. For example, the femto node 210a may use the same PN offset as the femto node 210b. Thus, the AT 220 may not be able to distinguish the femto node 210a from the femto node 210b. For example, as shown in FIG. 2, the femto area 230a and the femto area 230b overlap forming an area of overlap 260. The femto nodes 210a, 210b may use the same PN offset for identification. Accordingly, the AT 220 within the area of overlap may receive information from each of the femto nodes 210a, 210b using the same PN offset. The AT 220, therefore, may not be able to determine the sender of information when receiving information from each of the femto nodes 210a, 210b. The use of the same PN offset by multiple nodes in the same geographic area may be referred to as a PN collision. It may be desirable to avoid such PN collisions. Avoiding such PN collisions through network planning, however, may be difficult in systems where nodes are deployed unplanned. Accordingly, embodiments described herein may resolve PN collisions. It should be noted that similar collisions may be detected and resolved according to the embodiments described herein. For example collisions between primary scrambling codes may be detected and resolved for UMTS networks and collisions between physical cell identifiers may be detected and resolved for LTE networks, etc.

In one embodiment, a PN collision is resolved as follows. In this embodiment the femto node 210a can detect the transmissions of the femto node 210b and vice versa. Accordingly, the femto node 210a and/or the femto node 210b can detect the PN offset used by the other femto node. Therefore, the femto node 210a and/or the femto node 210b may learn that a PN collision has occurred when the femto node 210a and the femto node 210b are using the same PN offset. In one embodiment, the femto node 210a detects the PN offset of the femto node 210b and selects a new PN offset to use that is different than the PN offset used by the femto node 210b and or other femto nodes in the same geographic area. The femto node 210a then uses the new PN offset for transmissions. Thus, the PN collision is resolved.

In another embodiment, the femto node 210a cannot detect the transmissions of the femto node 210b and vice versa. For example, the femto node 210a may not be within the femto area 230b. Further, the femto node 210b may not be within the femto area 230a. Accordingly, the femto nodes 210a and 210b may not "hear" (i.e., detect) signals transmitted by each other. Therefore, the femto node 210a cannot detect the PN offset from the regular transmissions of the femto node 210b, and vice versa. Thus, neither the femto node 210a nor the femto node 210 can detect a PN offset collision between the femto node 210a and the femto node 210b.

In one embodiment, the femto nodes 210 may each be configured to transmit their respective PN offset in a highly detectable pilot signal (HDP). One of ordinary skill in the art will recognize that other signals besides the HDP may be used with the embodiments described herein. The HDPs may comprise the PN offsets of the femto nodes 210. The distance or "range" that the HDP is detectable may be greater than the distance other signals transmitted by the femto nodes 210 are detectable. Therefore, though each of the femto nodes 210 may not detect other signals transmitted by each other, each of the femto nodes 210 may detect the HDP of the other femto node. Accordingly, the femto node 210a and/or the femto node 210b can determine the PN offset of the other femto node from the HDP of the other node and resolve the PN collision as described above. For example, though the femto node 210b is not within the femto area 230a, it may be within an area 232a. The area 232a represents the area where the HDP of the femto node 210a is detectable.

The increased range of detection of the HDP may occur due to reduced interference levels when transmitting the HDP. For example, each femto node 210a, 210b may be configured to transmit the HDP at one or more pre-assigned time slots in a recurring sequence of time slots used for HDPs. The recurring time slots may occur periodically along with other time slots not used for HDPs. The duration of the HDP time slots may be short (e.g., 0.33 ms). For example, a recurring sequence of time slots 1-20 may occur periodically. Further, time slots 1-6 may be used for HDPs. Femto node 210a may be pre-assigned time slots 1, 2, and 5 to transmit an HDP. Femto node 210b may be pre-assigned time slots 2, 3, and 6 to transmit an HDP. Accordingly, the femto node 210a does not transmit an HDP during the time slots 3, 4, and 6. Further, the femto node 210b does not transmit an HDP during the time slots 1, 4, and 5. Accordingly, fewer signals may be transmitted during HDP time slots, as not all femto nodes transmit during each HDP time slot. The fewer transmitted signals leads to less interference, which leads to an increased detection range of the HDP.

In one embodiment, the time slots are assigned by a configuration server (CS) 254. In another embodiment, the femto nodes 210 use a random reuse pattern. In this embodiment, some femto nodes may use the same time slots to transmit the HDP. However, the number of femto nodes transmitting the HDP during a given time slot is much less than the number of femto nodes transmitting during time slots not reserved for transmitting the HDP.

In another embodiment, a wall 265 may block a direct line-of-sight between the femto nodes 210a and 210b. Accordingly, the femto node 210a cannot detect the normal transmissions of the femto node 210b or the HDP of the femto node 210b, and vice versa. Accordingly, a PN collision between the femto nodes 210a and 210b may not be directly detectable by either of the femto nodes 210. However, a device (e.g., AT 220) that is within range of the HDP of the femto nodes 210 may hear the HDP of both the femto node 210a and the femto node 210b. For example, as discussed above, the HDP of the femto node 210a is transmitted during a different set of time slots than the HDP of the femto node 210b is transmitted. The AT 220 may "hear" (i.e., detect) an HDP with the same PN offset as the femto node 210a at a time slot that is different from the set of time slots assigned to the femto node 210a. Therefore, the AT 220 can determine that a PN collision has occurred.

In one embodiment, the AT 220 may be communicating with the femto node 210a over a communication channel (e.g., a control channel). The AT 220 may receive the PN offset of the femto node 210a from the femto node 210a. Further, the AT 220 may receive the set of time slots assigned to the femto node 210a for HDPs from the femto node 210a. The AT 220 may further be configured to listen (i.e., monitor) for additional HDPs. The AT 220 may receive a first HDP at a first time slot from the femto node 210b. The AT 220 then determines if the PN offset of the first HDP is the same as the PN offset of the femto node 210a. If the PN offset of the first HDP is the same as the PN offset of the femto node 210a, the AT 220 further determines if the first time slot is different from the set of time slots assigned to the femto node 210a. If the first time slot is different from the set of time slots assigned to the femto node 210a, the AT 220 determines that a PN collision has occurred between the femto node 210a and the femto node 210b. The AT 220 may then report the PN collision to the femto node 210a over the communication channel that the AT 220 communicates with the femto node 210a. The femto node 210a may then resolve the PN collision by selecting a new PN offset to communicate that is different than the PN offset used by other femto nodes in the same geographic area.

In one embodiment, the femto node 210a may be configured to select a new PN offset by querying a server (e.g., CS 254) for a new PN offset. For example, the femto node 210a may send a message requesting a new PN offset to the Internet 240. The message may comprise a unique identifier (e.g., Access Point ID, Sector ID, Basestation ID, Femto Equipment Identifier, IP address, MAC address, etc.) of the femto node 210a. The Internet 240 transmits the message to the CS 254. The CS 254 may comprise a database listing the PN offsets used by the femto nodes connected to the CS 254. The CS 254 may select a new PN offset for the femto node 210a that is different than the PN offsets used by the other femto nodes connected to the CS 254. The CS 254 may then update the database with the new PN offset of the femto node 210a. The CS 254 may transmit a message indicative of the new PN offset to the Internet 240. The Internet 240 transmits the message to the femto node 210a. The femto node 210a may then use the new PN offset for communication.

In another embodiment, the AT 220 may receive a unique identifier of the femto node 210a from the femto node 210a while communicating with the femto node 210a over the communication channel. The AT 220 may further be communicating with another node (e.g., macro node 205) and may report the PN collision to the macro node 205. In another embodiment, the AT 220 may store information indicative of the unique identifier of the femto node 210a and the PN collision. The AT 220 may report the PN collision to another node (e.g., macro node 205) at a later time that it is in data communication with the other node. For example, the AT 220 may generate a message indicative of the PN collision and the unique identifier of the femto node 210a to the macro node 205. The macro node 205 may transmit the message to the PDG 252. The PDG 252 may further transmit the message to a server (e.g., the CS 254) via the Internet 240. The CS 254 may comprise a database listing the PN offsets used by the femto nodes connected to the CS 254. The CS 254 may select a new PN offset for the femto node 210a that is different than the PN offsets used by the other femto nodes connected to the CS 254. The CS 254 may then update the database with the new PN offset of the femto node 210a. The CS 254 may transmit a message indicative of the new PN offset to the Internet 240. The Internet 240 transmits the message to the femto node 210a. The femto node 210a may then use the new PN offset for communication.

Figure 3:
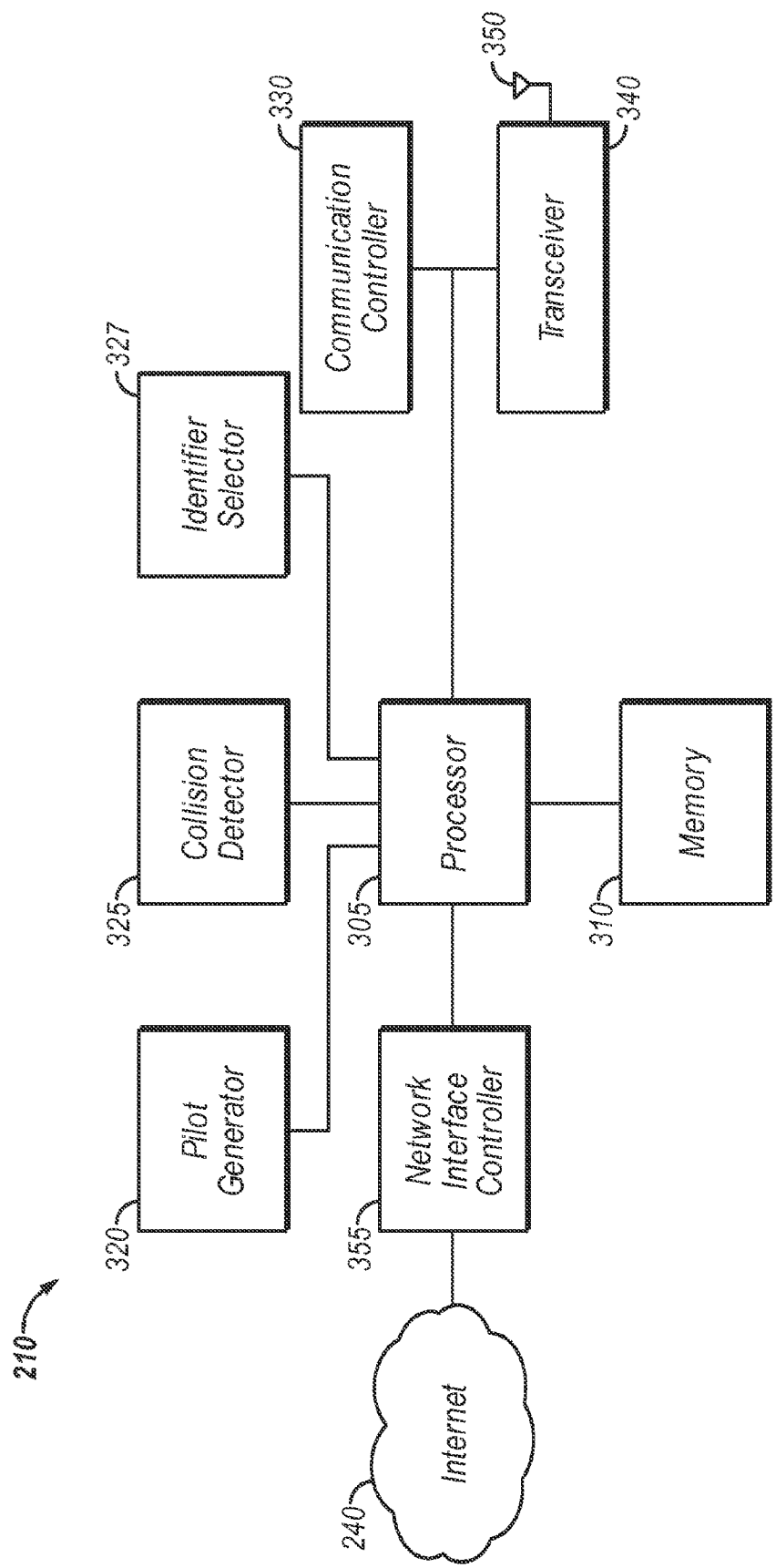
FIG. 3 is a functional block diagram of an exemplary femto node shown in FIG. 2.

FIG. 3 is a functional block diagram of an exemplary femto node 210 shown in FIG. 2. As discussed above with respect to FIG. 2, the femto node 210 may provide the AT 220 communication access to the communication network 250 via the Internet 240. The AT 220 may transmit information to an antenna 350 of the femto node 210. The antenna 350 may be configured to receive the information transmitted from the AT 220. The antenna 350 may further be coupled to a transceiver 340. The transceiver 340 may be configured to demodulate the information received from the AT 220. Similarly, the femto node 210 may receive information transmitted from another femto node. The transceiver 340 may further be coupled to a communication controller 330 configured to control the demodulation of information by the transceiver 340. Both the transceiver 340 and the communication controller 330 may further be coupled to a processor 305. The processor 305 may further process the demodulated information for storage, transmission, and/or for the control of other components of the femto node 210. The processor 305 may further be coupled, via one or more buses, to read information from or write information (e.g., the processed information) to a memory 310. The processor 305 may also be coupled to a network interface controller 355 configured to communicate with the Internet 240. Accordingly, processed information may be sent from processor 305 to another node via the network interface controller 355 and the Internet 240.

The processor 305 may also be coupled to a pilot generator 320 configured to generate an HDP for transmission to the AT 220 as discussed above with reference to FIG. 2. As discussed above, the HDP may comprise the PN offset used by the femto node 210 for communication. The pilot generator 320 may generate an HDP and send the HDP to the processor 305. The processor 305 may then send the HDP to the communication controller 330 and the transceiver 340. The communication controller 330 and the transceiver 340 may prepare the HDP for wireless transmission via the antenna 350. In one embodiment, the HDP may be generated and/or transmitted during one or more pre-assigned time slots periodically and received by another femto node or an AT, such as, for example, the AT 220.

The processor 305 may also be coupled to a collision detector 325. The collision detector 325 may be configured to determine whether an HDP comprising the same identifier (e.g., PN offset) as used by the femto node 210 is detected as discussed above with respect to FIG. 2. For example, an HDP may be received at the femto node 210 via the antenna 350 from another femto node. The HDP may be demodulated by the transceiver 340. The communication controller 330 may control the demodulation of the HDP by the transceiver 340. The HDP may then be sent to the processor 305, which may process the HDP. The processor 305 forwards the HDP to the collision detector 325. In one embodiment, the collision detector 325 may determine whether the PN offset of the received HDP is the same as the PN offset used by the femto node 210. The collision detector 325 may then signal to the processor 305 that a PN collision has been detected as described with respect to FIG. 2.

The processor 305 may further be coupled to an identifier selector 327. The identifier selector 327 may be configured to select a new identifier (e.g., PN offset) for use by the femto node 210. In one embodiment, the pilot detector 325 signals to the processor 305 that a PN collision has been detected. The processor 305 then signals the identifier selector 327 to select a new PN offset. In another embodiment, the femto node 210 receives a message indicative of a PN collision via the antenna 350 from another device such as the AT 220 as discussed above with respect to FIG. 2. The message may be demodulated by the transceiver 340. The communication controller 330 may control the demodulation of the message by the transceiver 340. The message may then be sent to the processor 305, which may process the message. The processor 305 then signals the identifier selector 327 to select a new PN offset.

In one embodiment, the identifier selector 327 selects a new PN offset at random from a set of PN offsets reserved for femto nodes as discussed above with respect to FIG. 2. In another embodiment, the identifier selector receives a new PN offset from a server accessible via the Internet 240 as discussed above with respect to FIG. 2. For example, the identifier selector 327 may generate a request for a new PN offset and send the request to the processor 305. The request may comprise a unique identifier (e.g., address) of the femto node 210. The processor 305 may process the request and send the processed request to the network interface controller 355. The network interface controller 355 may modulate the request for transmission over the Internet 240 and transmit the request to the Internet 240. The Internet 240 may send the request to a server (e.g., CS 254) that is connected to the Internet 240.

In one embodiment, the identifier selector may receive a new PN offset from a server for the femto node 210 to use. For example, the femto node 210 may receive a message comprising the new PN offset via the network interface controller 355. The message may be sent to the network interface controller 355 from a server via the Internet 240. The network interface 355 may demodulate the response message and send the message to the processor 305. The processor 305 may then forward the message to the identifier selector 327. The identifier selector 327 may then select the PN offset indicated in the message as the new PN offset. The processor 305 may further be configured to send a unique identifier of the femto node 210 to the AT 220. For example, the femto node 210 may receive a request for a unique identifier at the antenna 350. The communication controller 330 and the transceiver 340 may demodulate the request and send the request to the processor 305. The processor 305 may retrieve the unique identifier from the memory 310 where it is stored. The processor 305 may generate a message indicative of the unique identifier and send it to the transceiver 340. The communication controller 330 may control the modulation of the message by the transceiver 340. The transceiver 340 may send the message to the AT 220 via the antenna 350 as discussed above with respect to FIG. 2.

The antenna 350 may be configured to send and/or receive information to and/or from the AT 220 and/or other femto nodes over one or more frequency channels. The information may comprise voice and/or data-only information (referred to herein as "information"). The antenna may comprise one or more physical and/or virtual antennas.

The communication controller 330 and the transceiver 340 may be configured to demodulate the information received via the antenna 350 according to one or more radio standards using methods known in the art. Further, the communication controller 330 and the transceiver 340 may modulate information to be sent from the femto node 210 via the antenna 350 according to one or more radio standards using methods known in the art. Information to be sent may be received from the processor 305.

The processor 305 may read and write portions of the information and/or packets (e.g., voice information, data information, pilot signals, PN offset, a unique identifier, etc.)

destined for the AT 220 and/or other ATs and/or other femto nodes to and from the memory 310.

The femto node 210 may connect to a communication network, such as, for example, the Internet 240 via the network interface controller 355. Accordingly, femto node 210 may communicate through the Internet 240 with other nodes coupled to the communication network 250 and/or the PDG 252 as discussed above with respect to FIG. 2.

Although described separately, it is to be appreciated that functional blocks described with respect to the femto node 210 need not be separate structural elements. For example, the processor 305 and the memory 310 may be embodied in a single chip. The processor 305 may additionally, or in the alternative, contain memory, such as processor registers. Similarly, two or more of the processor 305, the pilot generator 320, the communication controller 330, the transceiver 340, the collision detector 325, and the identifier selector 327 may be embodied in a single chip. Further, the transceiver 340 may comprise a transmitter, receiver, or both. In other embodiments, the transmitter and receiver are two separate components.

The memory 310 may comprise processor cache, including a multi-level hierarchical cache in which different levels have different capacities and access speeds. The memory 310 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the femto node 210 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 4:
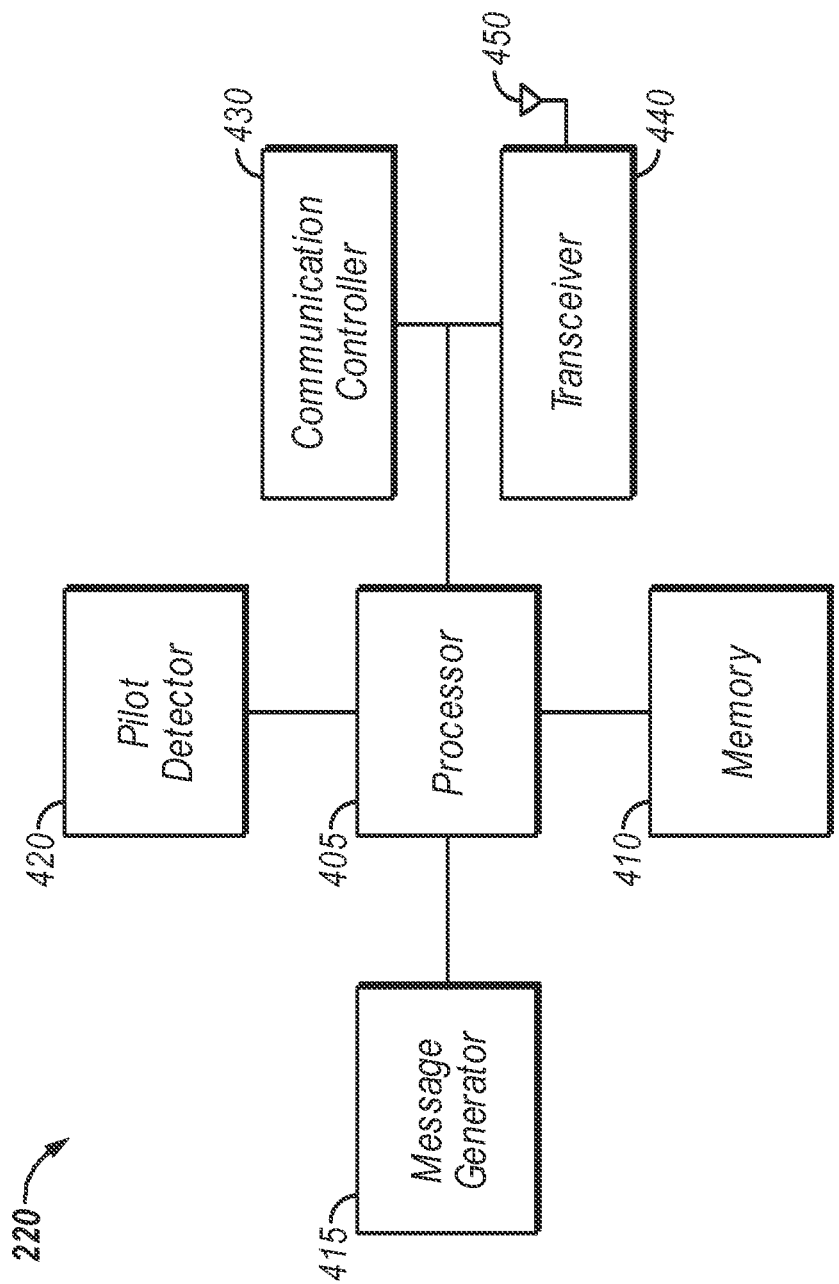
FIG. 4 is a functional block diagram of an exemplary access terminal shown in FIG. 2.

FIG. 4 is a functional block diagram of an exemplary access terminal 220 shown in FIG. 2. As discussed above with respect to FIG. 2, the AT 220 may be used to access the communication network 250. The AT 220 may access the communication network 250 via the femto node 210 and/or the macro node 205. The AT 220 may transmit and/or receive information to other ATs via the femto node 210 and/or the macro node 205 and the communication network 250.

The AT 220 may comprise a processor 405 configured to process information for storage, transmission, and/or for the control of other components of the AT 220. The processor 405 may further be coupled, via one or more buses, to read information from or write information (e.g., the processed information) to a memory 410. For example, the AT 220 may process information to be transmitted via the communication network 250. The processor 405 may also be coupled to a transceiver 440 configured to modulate the information to be transmitted. The transceiver 440 may further be coupled to a communication controller 430 configured to control the modulation of information by the transceiver 440. The transceiver may be further coupled to an antenna 450 configured to transmit the information from the AT 220 to the femto node 210 and/or the macro node 205. Accordingly, information may be generated and sent from the AT 220 to the femto node 210 and/or the macro node 205. Similarly, AT 220 may also receive information from the femto node 210 and/or the macro node 205. For example, the AT 220 may receive information indicative of the PN offset of the femto node 210 and/or the time slots assigned to the femto node 210 for HDPs from the femto node 210 as discussed above with respect to FIG. 2.

The processor 405 may also be coupled to a pilot detector 420. The pilot detector 420 may be configured to determine whether one or more HDPs, are detected at one or more time slots that are different from the time slots assigned to another femto node for HDPs as discussed above with respect to FIG. 2. For example, a first HDP may be received at the AT 220 during a first time slot via the antenna 450. The first HDP may be demodulated by the transceiver 440. The communication controller 430 may control the demodulation of the first HDP by the transceiver 440. The HDP may then be sent to the processor 405, which may process the HDP. The processor 405 forwards the HDP to the pilot detector 420. In some embodiments, the pilot detector 420 may determine whether the PN offset of the first HDP is the same as a PN offset received from the femto node 210. The pilot detector 420 may also determine whether first time slot is different from the time slots assigned to the femto node 210 for HDPs. The pilot detector 420 may then signal to the processor 405 that a PN collision has been detected as described with respect to FIG. 2.

The processor 405 may further be coupled to a message generator 415. The message generator 415 may be configured to generate a message to send to the femto node 210a, the femto node 210b, and/or the macro node 205 reporting the PN collision as discussed above with respect to FIG. 2.

In one embodiment, the AT 220 may be communicating with the femto node 210a. The processor 405 may signal the message generator 415 to generate a message if the pilot detector 420 determines that a PN collision has occurred between the femto node 210a and the femto node 210b. The message generator 415 may then generate a message. The message may be used to indicate to the femto node 210a that the AT 220 has detected a PN collision. The message may then be sent to the processor 405 and then forwarded to the transceiver 440. The message may then be modulated by the communication controller 430 and the transceiver 440 for wireless transmission via the antenna 450 to the femto node 210a as discussed above with respect to FIG. 2.

In another embodiment, the AT 220 may be communicating with the femto node 210a. The processor 405 may send a request for a unique identifier of the femto node 210a to the femto node 210a if the pilot detector 420 determines that a PN collision has occurred between the femto node 210a and the femto node 210b. The processor 405 may send the request to the transceiver 440. The request may then be modulated by the communication controller 430 and the transceiver 440 for wireless transmission via the antenna 450 to the femto node 210a. The processor 440 may similarly receive a unique identifier from the femto node 210a in response to the request via the antenna 450, the transceiver 440, and the communication controller 430. The processor 405 may forward the unique identifier to the message generator 415. The processor 405 may signal the message generator 415 to generate a message indicative of the unique identifier of the femto node 210a and the PN collision. The message may then be sent to the processor 405. Optionally, the processor 405 may store the message in memory 410. The processor 405 may retrieve the message in memory 410 when the AT 220 is in communication with the macro node 205. The processor 405 may forward the message to the transceiver 440. The message may then be modulated by the communication controller 430 and the transceiver 440 for wireless transmission via the antenna 450 to the macro node 205 as discussed above with respect to FIG. 2.

The antenna 450 may be configured to send and/or receive information to and/or from the macro node 205 and/or the femto node 210 over one or more frequency channels. The information may comprise voice and/or data-only information (referred to herein as "information"). The antenna may comprise one or more physical and/or virtual antennas.

The communication controller 430 and the transceiver 440 may be configured to demodulate the information received via the antenna 450 according to one or more radio standards using methods known in the art. Further, the communication controller 430 and the transceiver 440 may modulate information to be sent from the AT 220 via the antenna 450 according to one or more radio standards using methods known in the art. Information to be sent may be received from the processor 405.

The processor 405 may read and write portions of the information and/or packets (e.g., voice information, data information, messages, etc.) destined for the femto node 210, macro node 205, and/or other ATs to and from the memory 410.

Although described separately, it is to be appreciated that functional blocks described with respect to the access terminal 220 need not be separate structural elements. For example, the processor 405 and the memory 410 may be embodied in a single chip. The processor 405 may additionally, or in the alternative, contain memory, such as processor registers. Similarly, two or more of the processor 405, the message generator 415, the pilot detector 420, the communication controller 430, and the transceiver 440 may be embodied in a single chip. Further, the transceiver 440 may comprise a transmitter, receiver, or both. In other embodiments, the transmitter and receiver are two separate components.

The memory 410 may comprise processor cache, including a multi-level hierarchical cache in which different levels have different capacities and access speeds. The memory 410 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the access terminal 220 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the access terminal 220 may also be implemented as a combination of computing devices, e.g., a combination of a DSP and a microprocessor, a plurality of microprocessors, one or more microprocessors in conjunction with a DSP communication, or any other such configuration.

Figure 5:
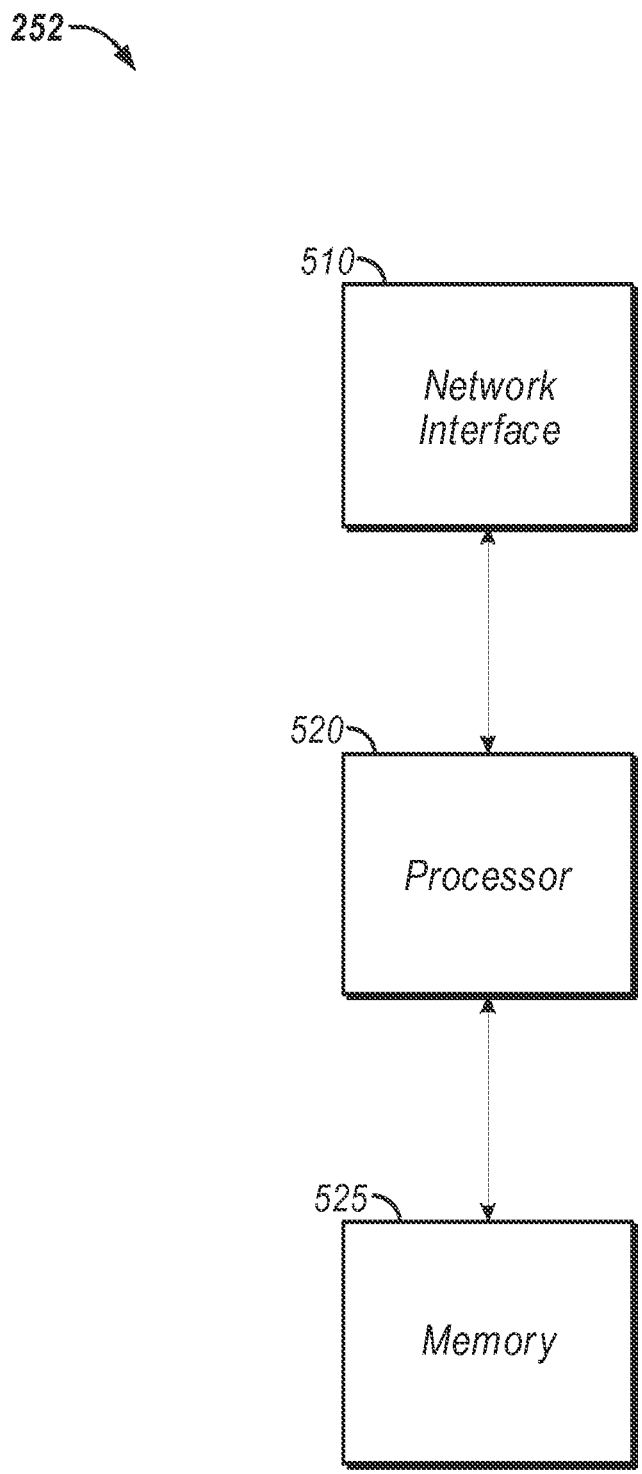
FIG. 5 is a functional block diagram of an exemplary packet data gateway shown in FIG. 2.

FIG. 5 is a functional block diagram of an exemplary packet data gateway (PDG) 252 shown in FIG. 2. As described above with respect to FIG. 2, the PDG 252 may operate as a router configured to route messages between the macro node 205 and the Internet 240. The PDG 252 may comprise a network interface 510 configured to receive an inbound message from and to transmit an outbound message to the macro node 205 or the Internet 240. The network interface 510 may be coupled to a processor 520. The processor 520 may be configured to process the inbound message received by and the outbound message transmitted by the network interface 510. The processor 520 may further be coupled, via one or more buses, to a memory 525. The processor 520 may read information from or write information to the memory 525. The memory 525 may be configured to store the inbound and outbound message before, during, or after processing.

The network interface 510 may comprise a modem. The modem may be configured to modulate/demodulate the outbound/inbound messages. The network interface 510 may demodulate the data received according. The demodulated data may be transmitted to the processor 520. The network interface 510 may modulate data to be sent from the PDG 252. Data to be sent may be received from the processor 520.

The memory 525 may comprise processor cache, including a multi-level hierarchical cache in which different levels have different capacities and access speeds. The memory 525 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the PDG 252 need not be separate structural elements. For example, the processor 520 and the memory 525 may be embodied in a single chip. The processor 520 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the PDG 252, such as processor 520 and network interface 510 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the PDG 252 may also be implemented as a combination of computing devices, e.g., a combination of a DSP and a microprocessor, a plurality of microprocessors, one or more microprocessors in conjunction with a DSP communication, or any other such configuration.

Figure 6:
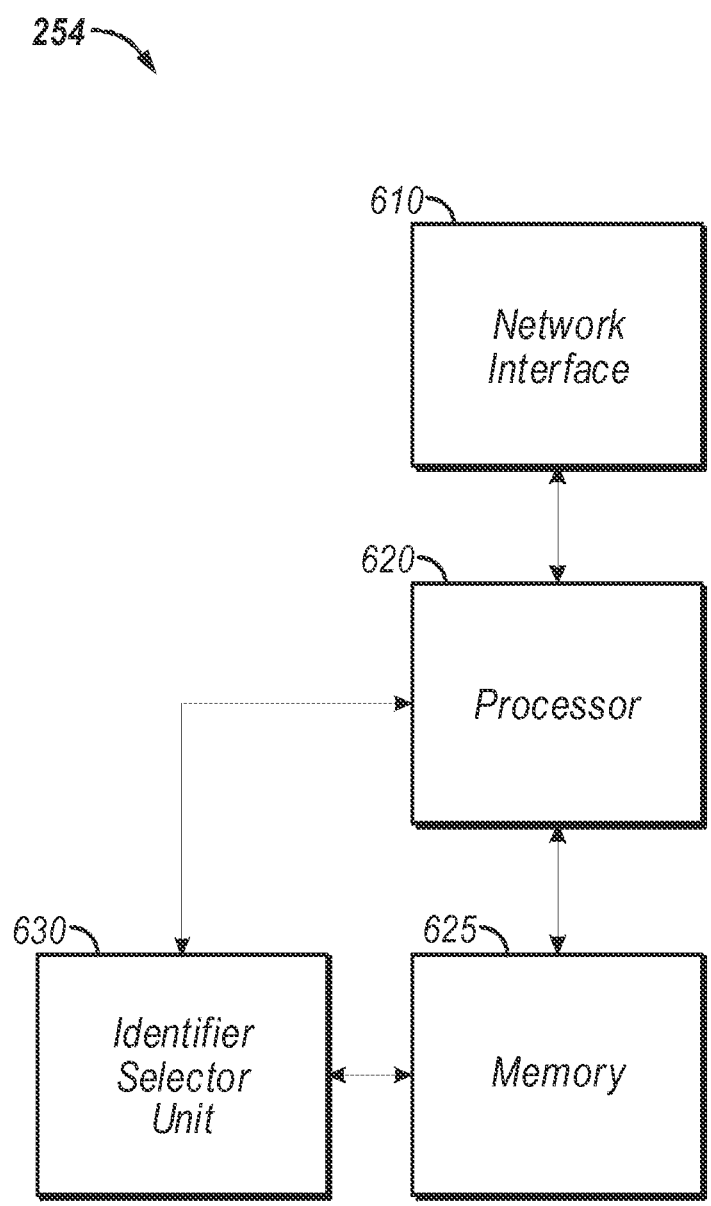
FIG. 6 is a functional block diagram of an exemplary configuration server shown in FIG. 2.

FIG. 6 is a functional block diagram of an exemplary configuration server shown in FIG. 2. As described above with respect to FIG. 2, the CS 254 may be configured to select a new identifier (e.g., PN offset) for femto nodes such as the femto node 210. The CS 254 may comprise a network interface 610 configured to receive an inbound message from and to transmit an outbound message to the femto node 210 via the Internet 240. The network interface 610 may be coupled to a processor 620. The processor 620 may be configured to process the inbound and outbound messages. The processor 620 may further be coupled, via one or more buses, to a memory 625. The processor 620 may read information from or write information to the memory 625. The memory 625 may be configured to store the inbound and outbound messages before, during, or after processing.

The processor 620 may be further coupled to an identifier selector unit 630. The processor 620 may pass the inbound message to the identifier selector unit 630 for additional processing. The identifier selector unit 630 may analyze the inbound message in order to select a new PN offset for a node (e.g., femto node 210). For example, the message may comprise a unique identifier of the femto node 210. The identifier selector unit 630 may be directly coupled to the memory 625 to facilitate making identifier selector decisions. For example, the memory 625 may store a data structure, e.g., a list or table, containing information associating addresses with other identifiers for femto nodes e.g., PN offsets. For example, the identifier selector unit 630 may be configured to look up the PN offset for a femto node in the memory 625 using the address. The identifier selector unit 630 may be configured to select a new PN offset for use by femto node 210 that is different than the PN offset of other femto nodes listed in the data structure. The identifier selector unit 630 may provide the new PN offset to the processor 620. The processor 620 may be configured to use this information from the identifier selector unit 630 to generate the outbound message for the femto node 210. The processor 620 may pass the outbound message to the network interface 610 for transmission to the Internet 240.

The network interface 610 may comprise a modem. The modem may be configured to modulate/demodulate the outbound/inbound messages going to or coming from the CS 254. The network interface 610 may demodulate the data received. The demodulated data may be transmitted to the processor 620. The network interface 610 may modulate data to be sent from the CS 254. Data to be sent may be received from the processor 620.

The memory 625 may comprise processor cache, including a multi-level hierarchical cache in which different levels have different capacities and access speeds. The memory 625 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the CS 254 need not be separate structural elements. For example, the processor 620 and the memory 625 may be embodied in a single chip. The processor 620 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the CS 254, such as processor 620 and identifier selector unit 630 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the CS 254 may also be implemented as a combination of computing devices, e.g., a combination of a DSP and a microprocessor, a plurality of microprocessors, one or more microprocessors in conjunction with a DSP communication, or any other such configuration.

Figure 7:
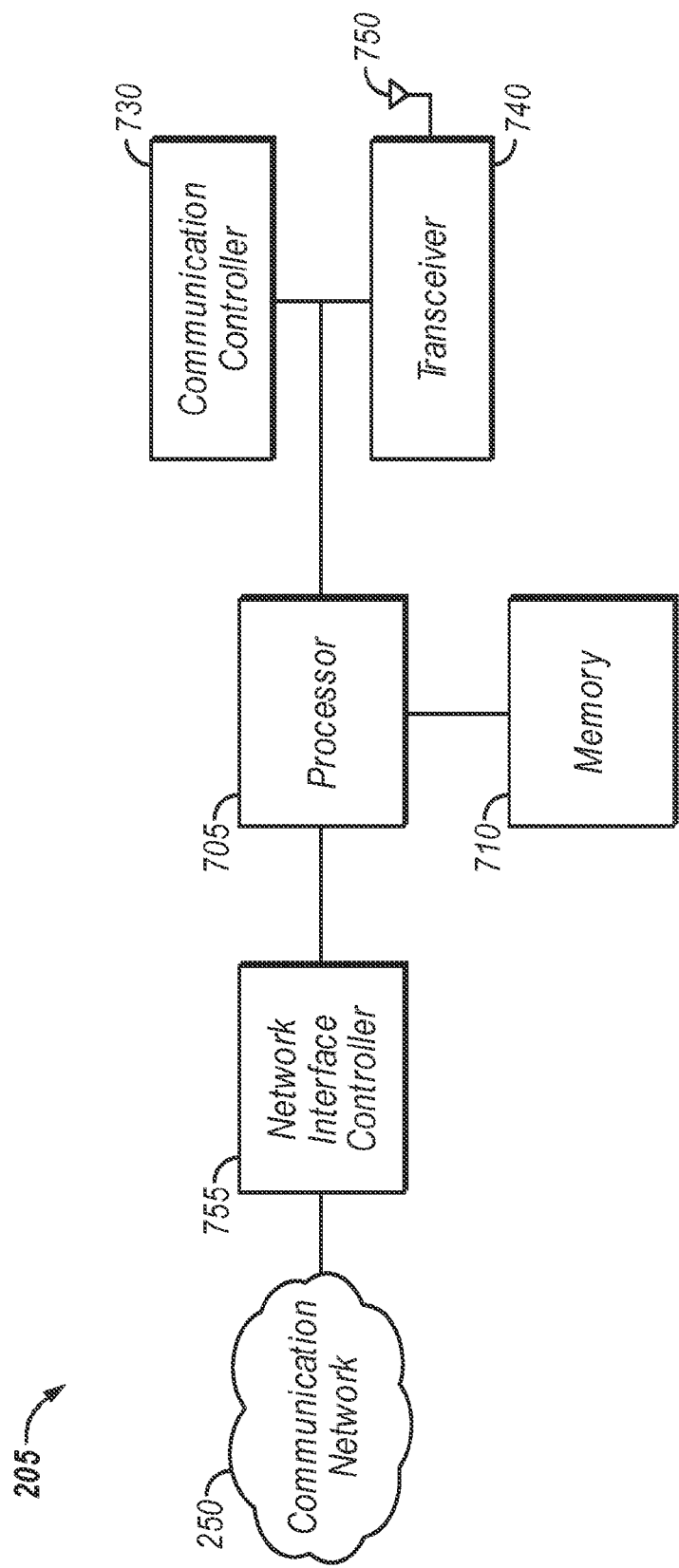
FIG. 7 is a functional block diagram of an exemplary macro node shown in FIG. 2.

FIG. 7 is a functional block diagram of an exemplary macro node 205 shown in FIG. 2. As discussed above with respect to FIG. 2, the macro node 205 may provide the AT 220 communication access to the communication network 250. The AT 220 may transmit information to an antenna 750 of the macro node 205. The antenna 750 may be configured to receive the information transmitted from the AT 220. The antenna 750 may further be coupled to a transceiver 740. The transceiver 740 may be configured to demodulate the information received from the AT 220. The transceiver 740 may further be coupled to a communication controller 730 configured to control the demodulation of information by the transceiver 740. Both the transceiver 740 and the communication controller 730 may further be coupled to a processor 705. The processor 705 may further process the demodulated information for storage, transmission, and/or for the control of other components of the macro node 205. The processor 705 may further be coupled, via one or more buses, to read information from or write information (e.g., the processed information) to a memory 710. The processor 705 may also be coupled to a network interface controller 755 configured to communicate with the communication network 250. Accordingly, processed information may be sent from processor 705 to the PDG 252 of the communication network 250 and/or another node via the network interface controller 755.

The antenna 750 may be configured to send and/or receive information to and/or from the AT 220 over one or more frequency channels. The information may comprise voice and/or data-only information (referred to herein as "information"). The antenna may comprise one or more physical and/or virtual antennas.

The communication controller 730 and the transceiver 740 may be configured to demodulate the information received via the antenna 750 according to one or more radio standards using methods known in the art. Further, the communication controller 730 and the transceiver 740 may modulate information to be sent from the macro node 205 via the antenna 750 according to one or more radio standards using methods known in the art. Information to be sent may be received from the processor 705.

The processor 705 may read and write portions of the information and/or packets (e.g., voice information, data information, messages, etc.) destined for the AT 220, other ATs, and/or the CS 254 to and from the memory 710.

The macro node 205 may connect to a communication network 250 via the network interface controller 755. Accordingly, macro node 205 may communicate with other nodes and/or the PDG 252 coupled to the communication network 250 as discussed above with respect to FIG. 2.

Although described separately, it is to be appreciated that functional blocks described with respect to the macro node 700 need not be separate structural elements. For example, the processor 705 and memory 710 may be embodied in a single chip. Similarly, two or more of the processor 705, communication controller 730, and transceiver 740 may be embodied in a single chip. Further, the transceiver 740 may comprise a transmitter, receiver, or both. In other embodiments, the transmitter and receiver are two separate components.

The memory 710 may comprise processor cache, including a multi-level hierarchical cache in which different levels have different capacities and access speeds. The memory 710 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the macro node 205 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 205 may also be implemented as a combination of computing devices, e.g., a combination of a DSP and a microprocessor, a plurality of microprocessors, one or more microprocessors in conjunction with a DSP communication, or any other such configuration.

Figure 8:
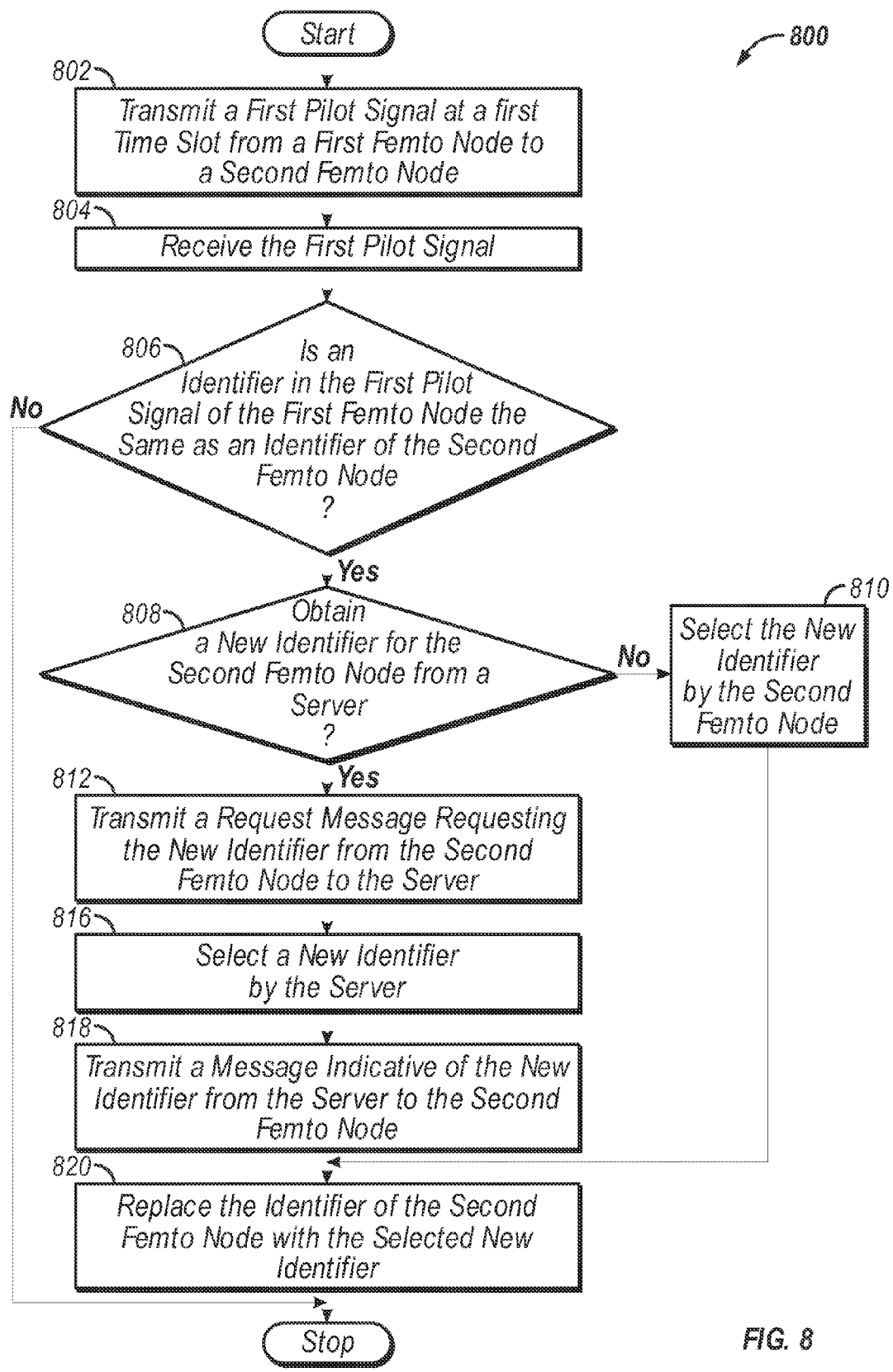
FIG. 8 is a flowchart of an exemplary process of detecting a PN collision between femto nodes similar to the femto node shown in FIG. 2.

FIG. 8 is a flowchart of an exemplary process of detecting a PN collision between femto nodes similar to the femto node shown in FIG. 2. The process 800 is one embodiment of a process used to resolve a PN collision between the femto nodes 210*a* and 210*b* as discussed above with respect to FIG. 2.

At a first step 802, the femto node 210*a* transmits a first pilot signal (e.g., a first HDP). The first pilot signal comprises information indicative of a first identifier (e.g., PN offset) of the femto node 210*a*. Continuing at a step 804, the femto node 210*b* receives the first pilot signal. Further, at step 806, the femto node 210*b* determines if the first identifier of the femto node 210*a* is the same as a second identifier (e.g., PN offset) of the femto node 210*b*. If the femto node 210*b* determines the first identifier of the femto node 210*a* is not the same as the second identifier of the femto node 210*b*, the process 800 ends. If the femto node 210*b* determines the first identifier of the femto node 210*a* is the same as the second identifier of the femto node 210*b*, the process 800 continues to a step 808. At the step 808, the femto node 210*b* determines if a new identifier (e.g., PN offset) is obtained from a server (e.g., the CS 254). If the femto node 210*b* determines the new identifier is not obtained from the server, the process continues to a step 810. At the step 810, the femto node 210*b* selects a new identifier. The process 800 then continues to a step 820. If the femto node 210*b* determines the new identifier is obtained from the server, the process continues to a step 812. At the step 812, the femto node 210*b* transmits a request message requesting a new identifier to the server. The request may comprise a unique identifier of the femto node 210*b*. Further, at a step 816, the server selects a new identifier for the femto node 210*b*. Next, at a step 818, the server transmits a message indicative of the new identifier to the femto node 210*b*. The process then continues to the step 820. At the step 820, the femto node 210*b* replaces its current second identifier with the new identifier. Accordingly, the PN collision is detected and resolved by the steps of process 800.

It should be noted that in one embodiment of the process 800, steps 808, 812, 816, and 818 are omitted. In another embodiment, steps 808 and 810 are omitted.

Figure 9:
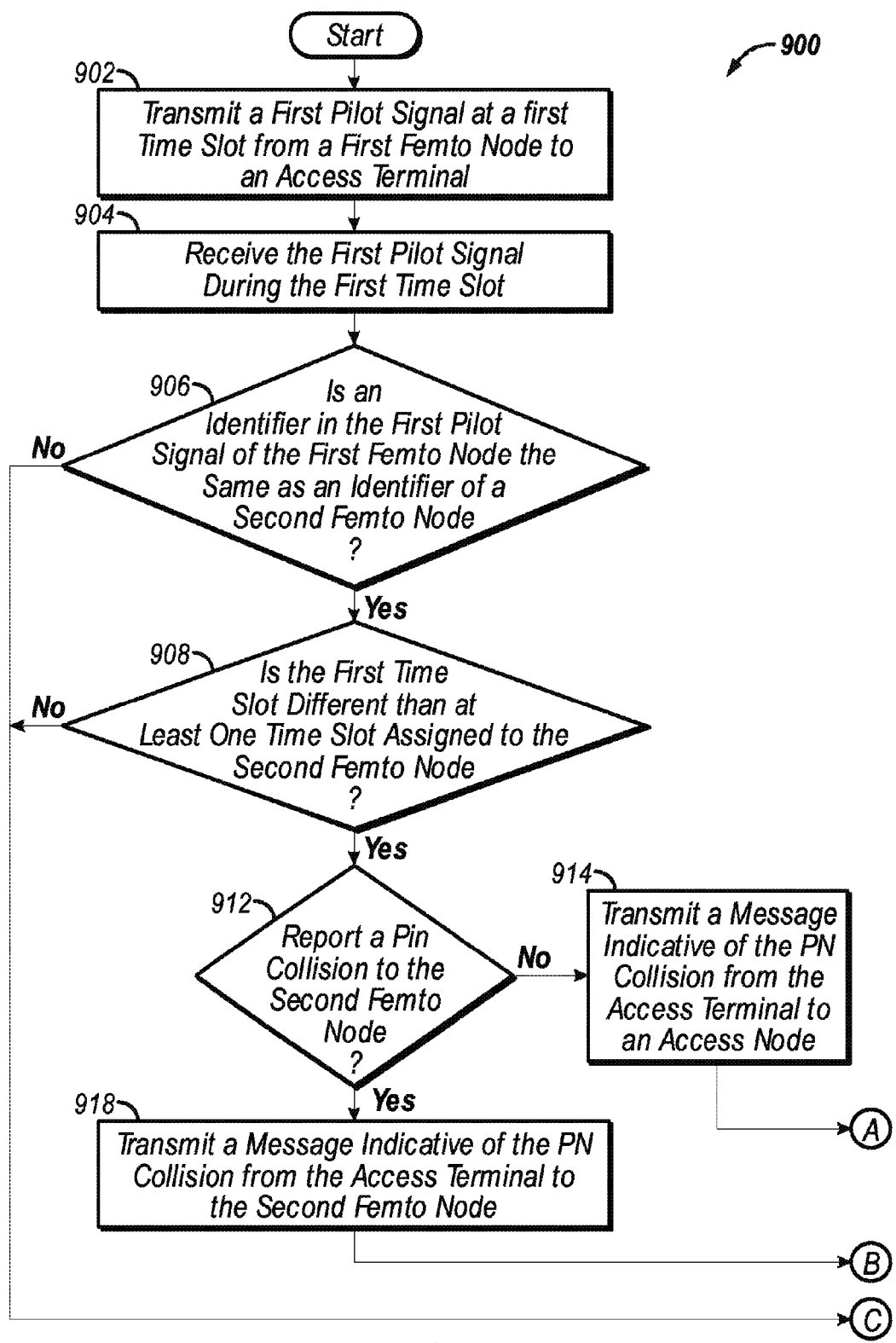
FIG. 9 is a flowchart of another exemplary process of detecting a PN collision between femto nodes similar to the femto node shown in FIG. 2.
Figure 9:
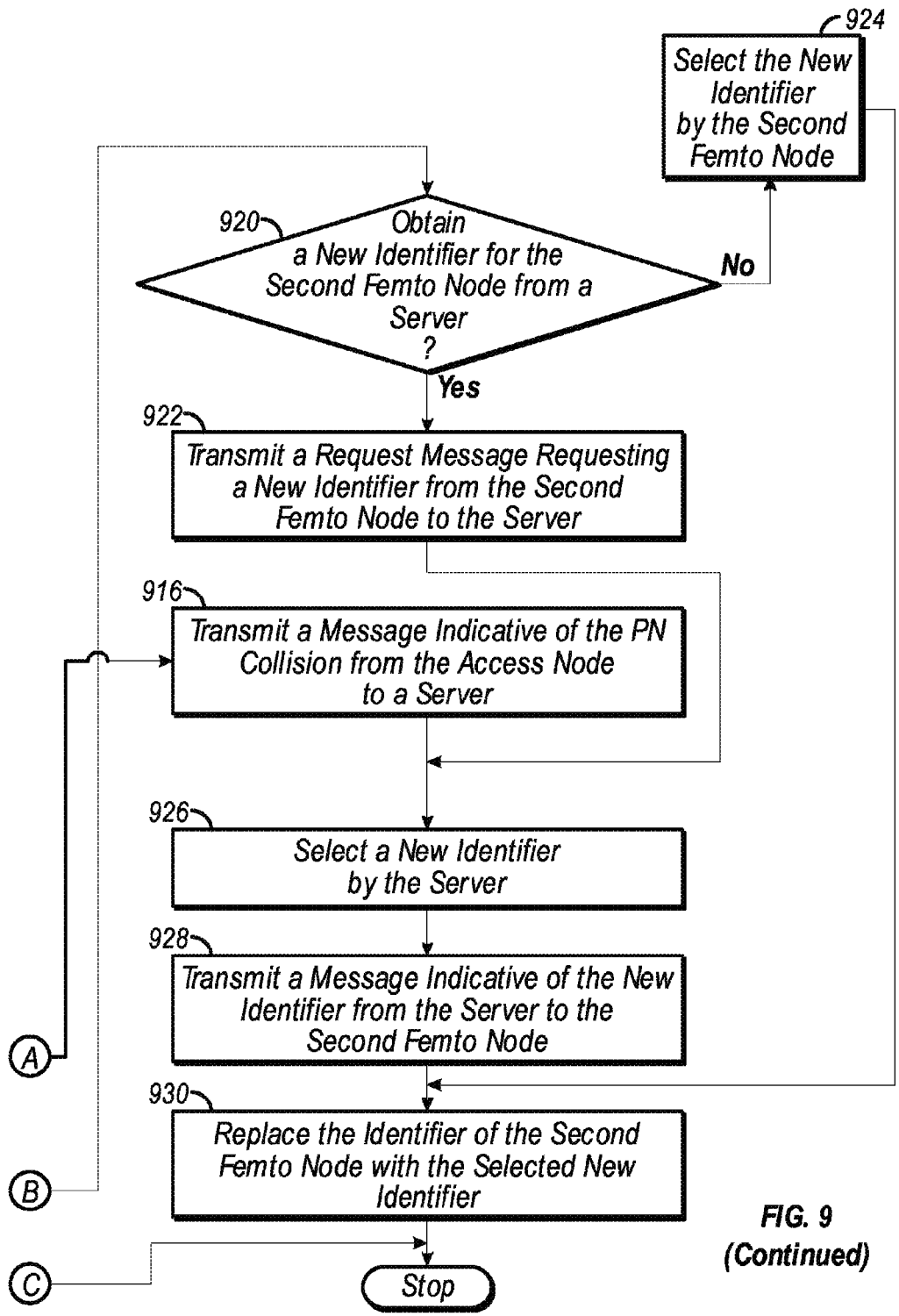

FIG. 9 is a flowchart of another exemplary process of detecting a PN collision between femto nodes similar to the femto node shown in FIG. 2. The process 900 is one embodiment of a process used to resolve a PN collision between the femto nodes 210*a* and 210*b* as discussed above with respect to FIG. 2.

At a first step 902, the femto node 210*a* transmits a first pilot signal (e.g., a first HDP) to the AT 220 at a first time slot. The first pilot signal comprises an identifier (e.g., the PN offset) of the femto node 210*a*. At a next step 904, the AT 220 receives the first pilot signal during the first time slot.

Continuing, at a step 906, the AT 220 decides if the identifier of the femto node 210*a* is the same as an identifier of another femto node (e.g., femto node 210*b*). If the AT 220 decides that the identifier of the femto node 210*a* is not the same as the identifier of the femto node 210*b*, the process 900 ends. However, if is the AT 220 determines that the identifier of the femto node 210*a* is the same as the identifier of the femto node 210*b*, the process 900 continues to a step 908.

At the step 908, the AT 220 determines if the first time slot is different than at least one time slot assigned to the femto node 210*b*. If the AT 220 determines the first time slot is not different than at least one time slot assigned to the femto node 210*b*, the process 900 ends. However, if the AT 220 determines the first time slot is different than at least one time slot assigned to the femto node 210*b*, a PN collision is detected and the process continues to a step 912.

At the step 912, the AT 220 determines if the PN collision is reported to the femto node 210*b*. If the AT 220 determines the PN collision is not reported to the femto node 210*b*, the process 900 continues to a step 914. At the step 914, the AT 220 transmits a message indicative of a PN collision to an access node (e.g., macro node 205). The message may comprise a unique identifier of the femto node 210*b*. Continuing at a step 916, the access node transmits the message to a server (e.g., the CS 254). The process 900 then continues to a step 926.

If at the step 912 the AT 220 determines the PN collision is reported to the femto node 210*b*, the process 900 continues to a step 918. At the step 918, the AT 220 transmits a message indicative of a PN collision to the femto node 210*b*. Continuing at a step 920, the femto node 210*b* determines if a new identifier (e.g., PN offset) is obtained from the server. If the femto node 210*b* determines the new identifier is not obtained from the server, the process 900 continues to a step 924. At the step 924, the femto node 210*b* selects a new identifier. The process 900 then continues to a step 930. If the femto node 210*b* determines the new identifier is obtained from the server, the process 900 continues to a step 922. At the step 922, the femto node 210*b* transmits a request message requesting a new identifier to the server. The request may comprise the unique identifier of the femto node 210*b*. The process 900 then continues to a step 926.

At the step 926, the server selects a new identifier for the femto node 210*b*. Next, at a step 928, the server transmits a message indicative of the new identifier to the femto node 210*b*. The process then continues to the step 930. At the step 930, the femto node 210*b* replaces its current second identifier with the new identifier. Accordingly, the PN collision is detected and resolved by the steps of process 900.

It should be noted that in other embodiments of the process 900, various steps may be added or omitted.

Figure 10:
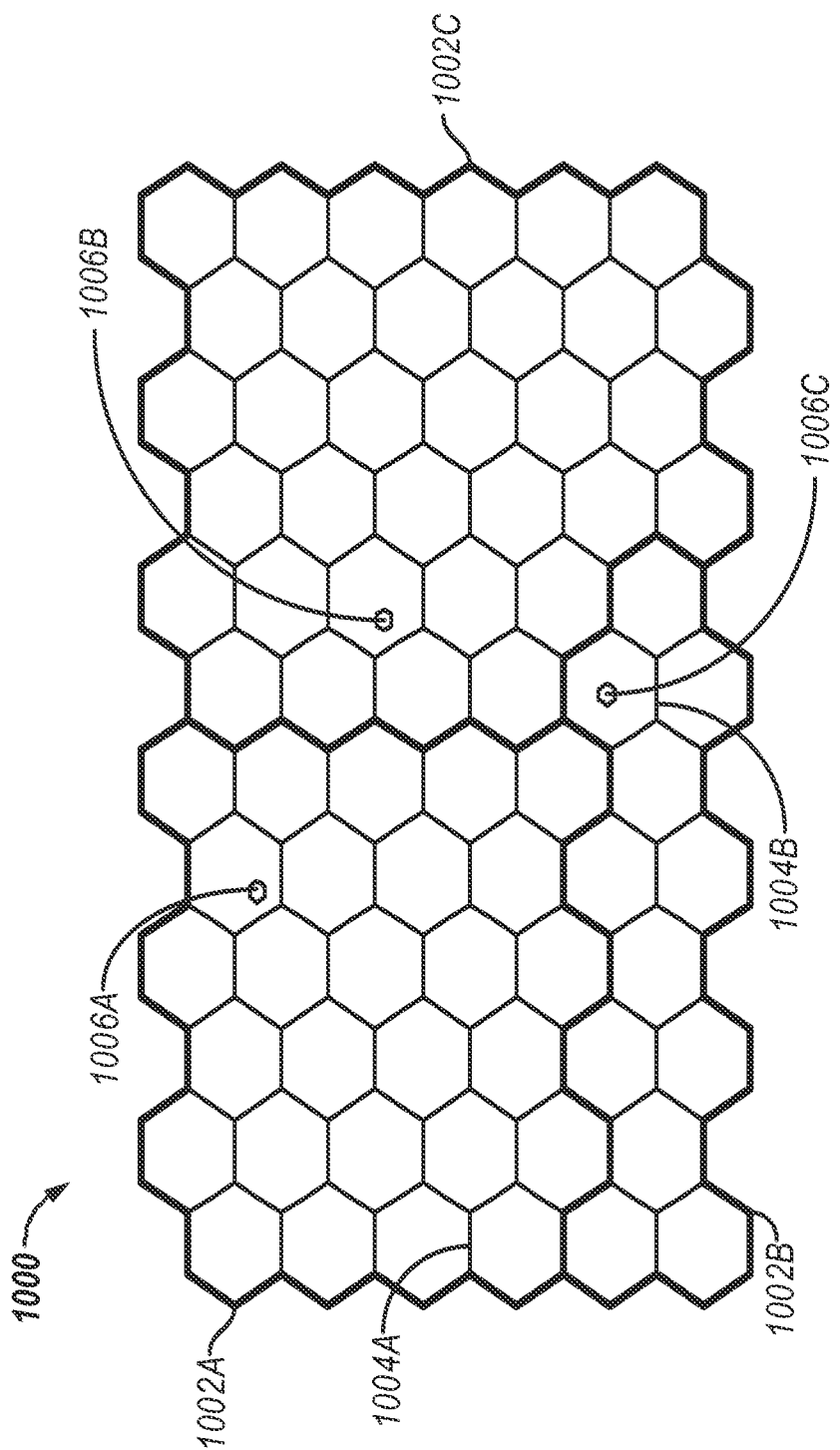
FIG. 10 illustrates exemplary coverage areas for wireless communication networks as shown, e.g., in FIGS. 1 and 2.

FIG. 10 illustrates exemplary coverage areas for wireless communication networks as shown, e.g., in FIGS. 1 and 2. The coverage area 1000 may comprise one or more geographical areas in which the AT 220 may access the communication network 250 as discussed above with respect to FIG. 2. As shown the coverage area 1000 comprises several tracking areas 1002 (or routing areas or location areas). Each tracking area 1002 comprises several macro areas 1004, which may be similar to the macro area 207 described above with respect to FIG. 2. Here, areas of coverage associated with tracking areas 1002A, 1002B, and 1002C are shown as delineated by wide lines as and the macro areas 1004 are represented by hexagons. The tracking areas 1002 may also comprise femto areas 1006, which may be similar to the femto area 230 described above with respect to FIG. 2. In this example, each of the femto areas 1006 (e.g., femto area 1006C) is depicted within a macro area 1004 (e.g., macro area 1004B). It should be appreciated, however, that a femto area 1006 may not lie entirely within a macro area 1004. In practice, a large number of femto areas 1006 may be defined with a given tracking area 1002 or macro area 1004. Also, one or more pico areas (not shown) may be defined within a given tracking area 1002 or macro area 1004.

Referring again to FIG. 2, the owner of the femto node 210a may subscribe to a mobile service, such as, for example, 3G mobile service, offered through the communication network 250 (e.g., a mobile operator core network). In addition, an access terminal 221 may be capable of operating both in macro environments (e.g., macro areas) and in smaller scale (e.g., residential, femto areas, pico areas, etc.) network environments. In other words, depending on the current location of the access terminal 221, the access terminal 221 may access the communication network 250 by a macro node 205 or by any one of a set of femto nodes (e.g., femto nodes 210a, 210b). For example, when a subscriber is outside his home, he may be served by a macro node (e.g., node 205) and when the subscriber is at home, he may be served by a femto node (e.g., node 210a). It should further be appreciated that the femto nodes 210 may be backward compatible with existing access terminals 221.

The femto node 210a may communicate over a single frequency or, in the alternative, over multiple frequencies. Depending on the particular configuration, the single frequency or one or more of the multiple frequencies may overlap with one or more frequencies used by a macro node (e.g., node 250).

In one embodiment, an access terminal 221 may be configured to connect to a particular (e.g., preferred) femto node (e.g., a home femto node of the access terminal 221) whenever the access terminal 221 is within communication range of the femto node. For example, the access terminal 221 may communicate with only the femto node 210a when the access terminal 221 is within the femto area 230a.

In another embodiment, the access terminal 221 is communicating with a node of the communication network 250 but is not communicating with a preferred node (e.g., as defined in a preferred roaming list). In this embodiment, the access terminal 221 may continue to search for a preferred node (e.g., the preferred femto node 210a) using a Better System Reselection ("BSR"). The BSR may comprise a method comprising a periodic scanning of available systems to determine whether better systems are currently available. The BSR may further comprise attempting to associate with available preferred systems. The access terminal 221 may limit the BSR to scanning over one or more specific bands and/or channels. Upon discovery of a preferred femto node 210a, the access terminal 221 selects the femto node 210a for communicating with to access the communication network 250 within the femto area 230.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210a). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 11:
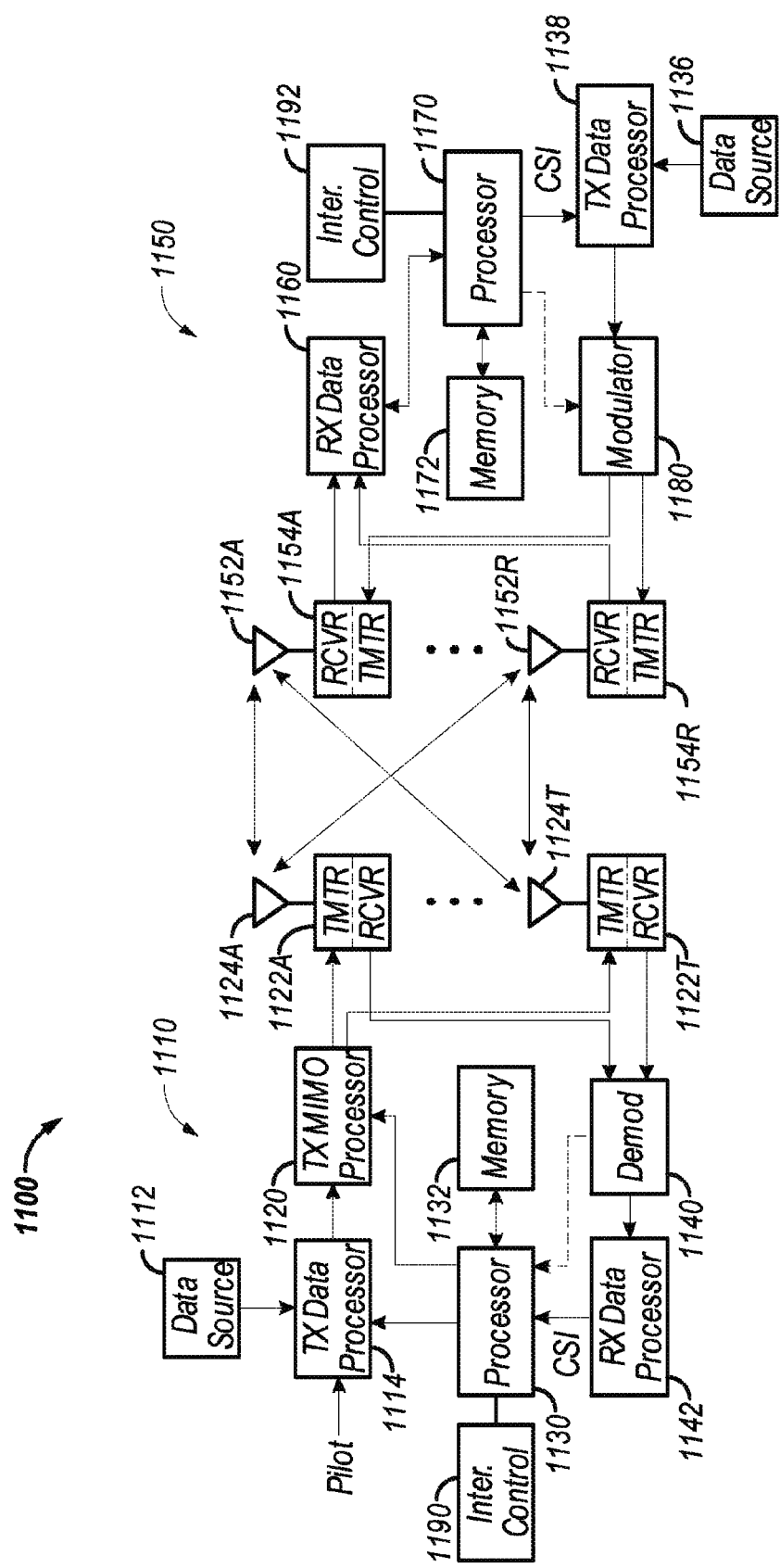
FIG. 11 is a functional block diagram of another exemplary node and another exemplary access terminal shown in FIG. 2.

FIG. 11 is a functional block diagram of another exemplary node and another exemplary access terminal shown in FIG. 2. As shown a MIMO system 1100 comprises a wireless device 1110 (e.g., the femto node 210a, 210b, the macro node 205, etc.) and a wireless device 1150 (e.g., the AT 220). At the device 1110, traffic data for a number of data streams is provided from a data source 1112 to a transmit ("TX") data processor 1114.

In one embodiment, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers ("XCVR") 1122A through 1122T. In some aspects, the TX MIMO processor 1120 applies beamforming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver ("XCVR") 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive ("RX") data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing performed by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138. The TX data processor 1138 also receives traffic data for a number of data streams from a data source 1136. The modulator 1180 modulates the data streams. Further, the transceivers 1154A through 1154R condition the data streams and transmits the data streams back to the device 1110.

At the device 1110, the modulated signals from the device 1150 are received by the antennas 1124. Further, the transceivers 1122 condition the modulated signals. A demodulator ("DEMOD") 1140 demodulates the modulated signals. A RX data processor 1142 processes the demodulated signals and extracts the reverse link message transmitted by the device 1150. The processor 1130 then determines which pre-coding matrix to use for determining the beam-forming weights. Further, the processor 1130 processes the extracted message.

Further, the device 1110 and/or the device 1150 may comprise one or more components that perform interference control operations as taught herein. For example, an interference ("INTER") control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130. Further, a single processing component may provide the functionality of the interference control component 1192 and the processor 1170.

Figure 12:
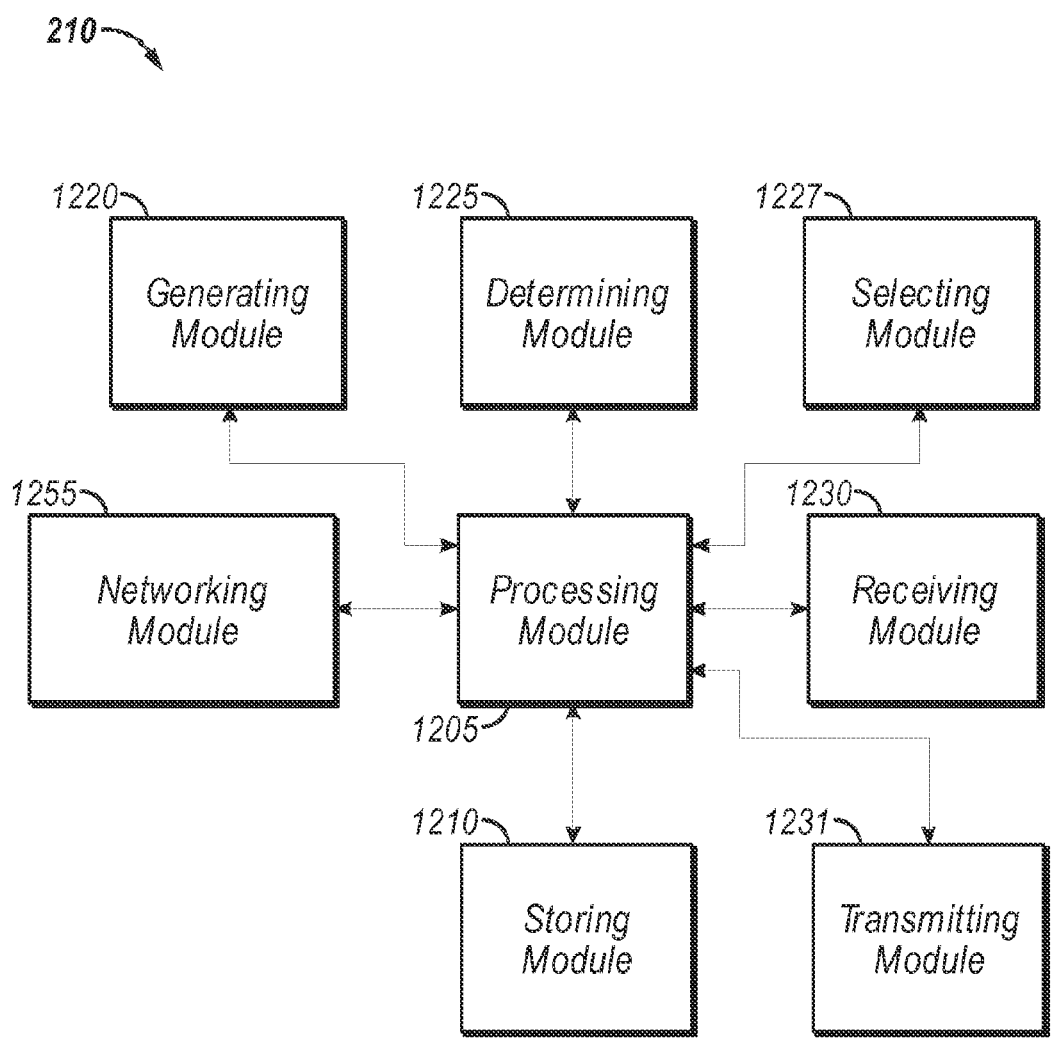
FIG. 12 is a functional block diagram of yet another exemplary femto node shown in FIG. 2.
Figure 13:
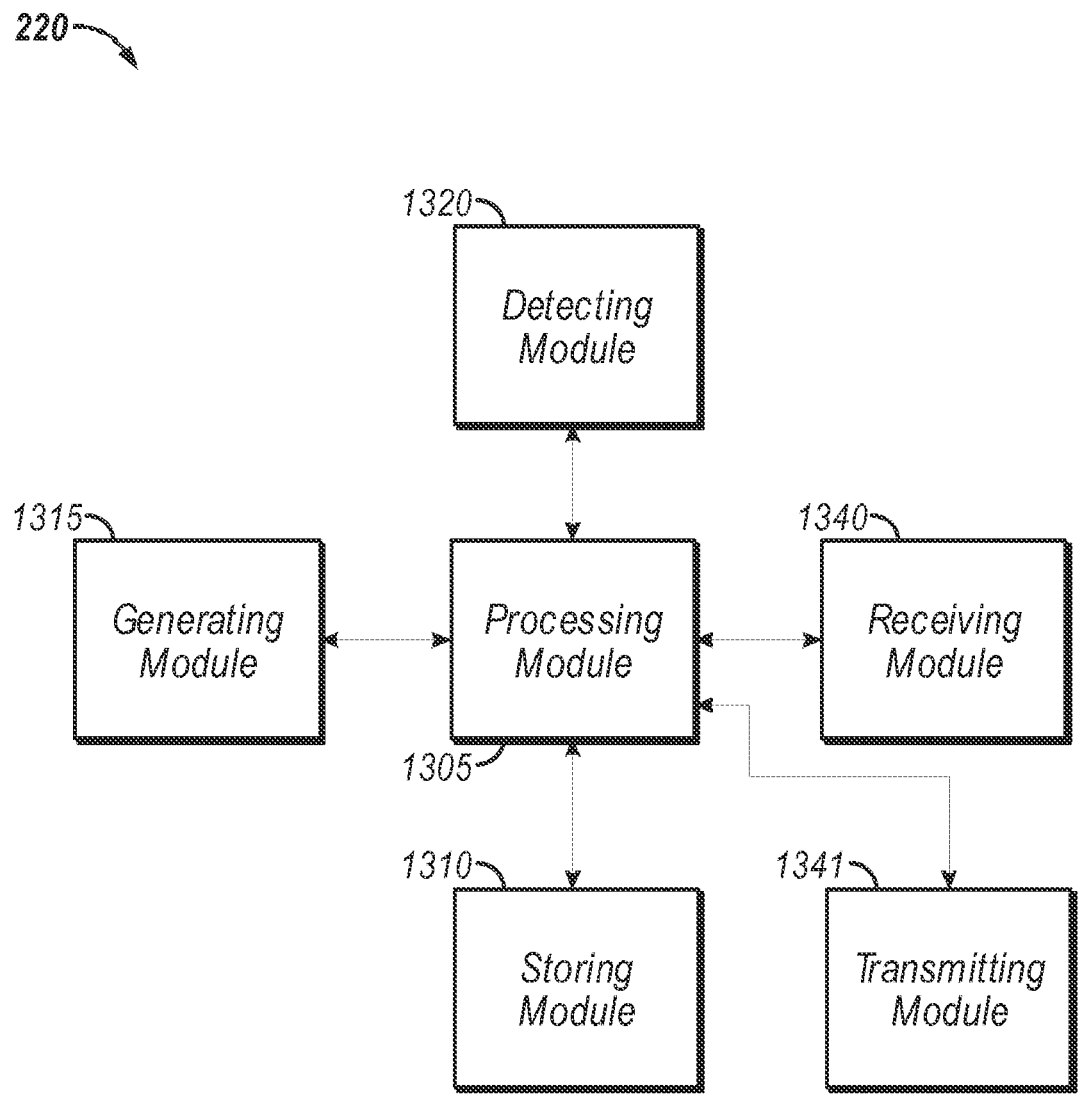
FIG. 13 is a functional block diagram of yet another exemplary access terminal shown in FIG. 2.
Figure 14:
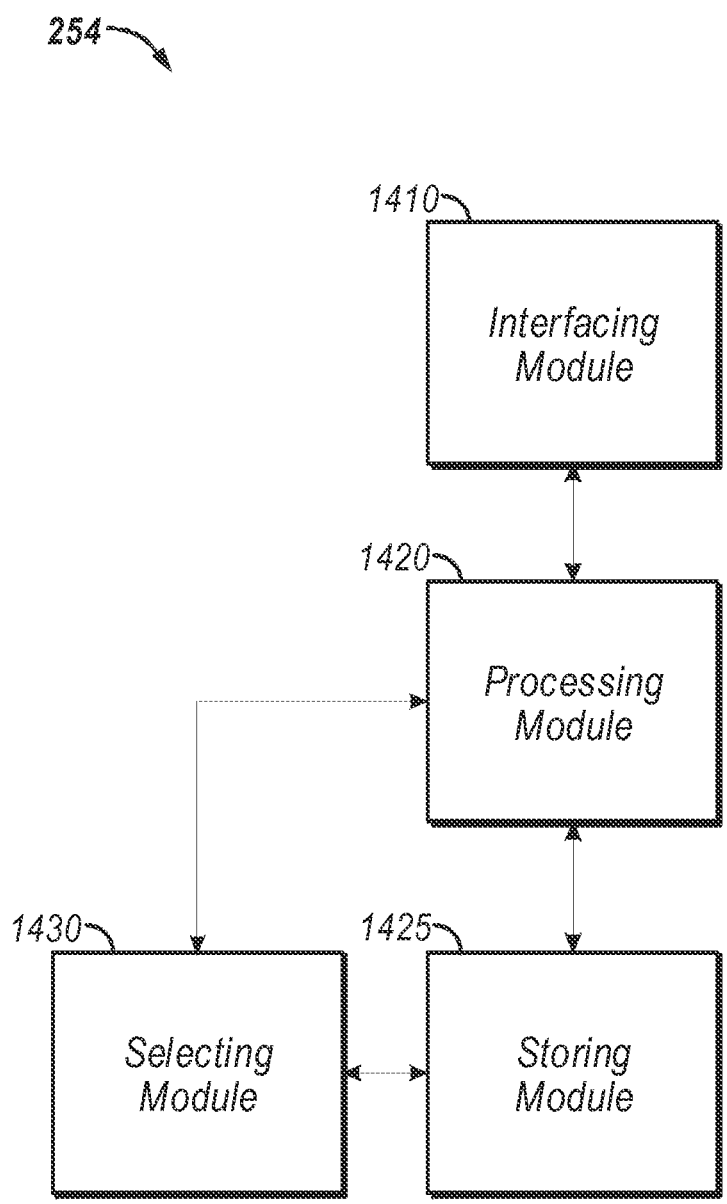
FIG. 14 is a functional block diagram of another exemplary configuration server shown in FIG. 2.

The functionality described herein (e.g., with regard to one or more of the accompanying figures) may correspond in some aspects to similarly designated "means for" functionality in the appended claims. Referring to FIGS. 12-14, the femto node 210, the AT 220, and the CS 254 are represented as a series of interrelated functional modules.

FIG. 12 is a functional block diagram of yet another exemplary femto node shown in FIG. 2. As shown, the femto node 210 may comprise a processing module 1205, a storing module 1210, a generating module 1220, a determining module 1225, a selecting module 1227, a receiving module 1230, a transmitting module 1231, and a networking module 1255. The processing module 1205 may correspond at least in some aspects to, for example, a processor as discussed herein. The storing module 1210 may correspond at least in some aspects to, for example, a memory as discussed herein. The generating module 1220 may correspond at least in some aspects to, for example, a pilot generator as discussed herein. The determining module 1225 may correspond at least in some aspects to, for example, a collision detector as discussed herein. The selecting module 1227 may correspond at least in some aspects to, for example, an identifier selector as discussed herein. The receiving module 1230 may correspond at least in some aspects to, for example, a transceiver as discussed herein. The transmitting module 1231 may correspond at least in some aspects to, for example, a transceiver as discussed herein. The networking module 1255 may correspond at least in some aspects to, for example, a network interface controller as discussed herein.

FIG. 13 is a functional block diagram of yet another exemplary access terminal shown in FIG. 2. As shown, the AT 220 may comprise a processing module 1305, a storing module 1310, a generating module 1315, a determining module 1320, a receiving module 1340, and a transmitting module 1341. The processing module 1305 may correspond at least in some aspects to, for example, a processor as discussed herein. The storing module 1310 may correspond at least in some aspects to, for example, a memory as discussed herein. The generating module 1315 may correspond at least in some aspects to, for example, a message generator as discussed herein. The detecting module 1320 may correspond at least in some aspects to, for example, a pilot detector as discussed herein. The receiving module 1340 may correspond at least in some aspects to, for example, a transceiver as discussed herein. The transmitting module 1341 may correspond at least in some aspects to, for example, a transceiver as discussed herein.

FIG. 14 is a functional block diagram of another exemplary configuration server shown in FIG. 2. As shown, the CS 254 may comprise an interfacing module 1410, a processing module 1420, a storing module 1425, and a selecting module 1430. The interfacing module 1410 may correspond at least in some aspects to, for example, a network interface as discussed herein. The processing module 1420 may correspond at least in some aspects to, for example, a processor as discussed herein. The storing module 1425 may correspond at least in some aspects to, for example, a memory as discussed herein. The selecting module 1430 may correspond at least in some aspects to, for example, an identifier selector unit as discussed herein.

The functionality of the modules of FIGS. 12-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless apparatus comprising:
   a transceiver configured to receive a first identifier during at least one time slot, the first identifier identifying a first remote communication node;
   a processing circuit configured to:
      determine, at the wireless apparatus, if the first identifier identifying the first remote communication node is received during a first time slot that is different from at least one pre-assigned time slot, and
      determine if the first identifier identifying the first remote communication node is the same as a second identifier identifying a second remote communication node, the second identifier being received during the same first time slot; and
   a message generator configured to generate a message for transmission to the first remote communication node if the first identifier is the same as the second identifier and if the first time slot is different from the at least one pre-assigned time slot, wherein the first remote communication node is configured to obtain in response to the message a new identifier not previously assigned, and wherein the new identifier is different than the first identifier and the second identifier.

2. The apparatus of claim 1, wherein the at least one pre-assigned time slot comprises a sequence of time slots that is uniquely reserved for communication by the first remote communication node.

3. The apparatus of claim 1, wherein the message comprises information indicative of a pseudo noise (PN) collision.

4. A wireless apparatus comprising:
   a transceiver configured to receive a first identifier during at least one time slot, the first identifier identifying a first communication node;
   a processing circuit configured to:
   determine if the first identifier is received during a first time slot that is different from at least one pre-assigned time slot, and
   determine if the first identifier identifying the first communication node is the same as a second identifier identifying a second communication node, the second identifier being received during the same first time slot; and
   a message generator configured to generate a first message for transmission to a third communication node if the first identifier is the same as the second identifier and if the first time slot is different from the at least one pre-assigned time slot, wherein the third communication node is further configured to transmit the first message to a server.

5. The apparatus of claim 4, wherein the first communication node obtains a new identifier in response to a second message, and wherein the first communication node receives the second message from the server.

6. The apparatus of claim 5, wherein the server obtains the new identifier.

7. The apparatus of claim 1, wherein the first identifier comprises a first pseudo noise offset applied to a pseudo noise short code.

8. A method of uniquely identifying a first remote communication node and a second remote communication node in a wireless communication system, the method comprising:
   receiving a first identifier during at least one time slot, the first identifier identifying the first remote communication node;
   determining, at a wireless entity, if the first identifier identifying the first remote communication node is received during a first time slot that is different from at least one pre-assigned time slot;
   determining if the first identifier identifying the first remote communication node is the same as a second identifier identifying a second remote communication node, the second identifier being received during the same first time slot; and
   transmitting a message to the first remote communication node if the first identifier is the same as the second identifier and if the first time slot is different from the at least one pre-assigned time slot, wherein the first remote communication node is configured to obtain in response to the message a new identifier not previously assigned, and wherein the new identifier is different than the first identifier and the second identifier.

9. The method of claim 8, wherein the at least one pre-assigned time slot comprises a sequence of time slots that is uniquely reserved for communication by the first remote communication node.

10. The method of claim 8, wherein the message comprises information indicative of a pseudo noise (PN) collision.

11. A method of uniquely identifying a first communication node and a second communication node in a wireless communication system, the method comprising:
   receiving a first identifier during at least one time slot, the first identifier identifying the first communication node;
   determining if the first identifier is received during a first time slot that is different from at least one pre-assigned time slot;
   determining if the first identifier identifying the first communication node is the same as a second identifier identifying a second communication node, the second identifier being received during the same first time slot; and
   transmitting a first message to a third communication node if the first identifier is the same as the second identifier and if the first time slot is different from the at least one pre-assigned time slot, wherein the third communication node is further configured to transmit the first message to a server.

12. The method of claim 11, wherein the first communication node obtains a new identifier in response to a second message, and wherein the first communication node receives the second message from the server.

13. The method of claim 12, wherein the server obtains the new identifier.

14. The method of claim 8, wherein the first identifier comprises a first pseudo noise offset applied to a pseudo noise short code.

15. A wireless apparatus comprising:
means for receiving a first identifier during at least one time slot, the first identifier identifying a first remote communication node;
means for determining, at the wireless apparatus, if the first identifier identifying the first remote communication node is received during a first time slot that is different from at least one pre-assigned time slot;
means for determining if the first identifier identifying the first remote communication node is the same as a second identifier identifying a second remote communication node, the second identifier being received during the same first time slot; and
means for transmitting a message to the first remote communication node if the first identifier is the same as the second identifier and if the first time slot is different from the at least one pre-assigned time slot, wherein the first remote communication node is configured to obtain in response to the message a new identifier not previously assigned, and wherein the new identifier is different than the first identifier and the second identifier.

16. The apparatus of claim 15, wherein the at least one pre-assigned time slot comprises a sequence of time slots that is uniquely reserved for communication by the first remote communication node.

17. The apparatus of claim 15, wherein the message comprises information indicative of a pseudo noise (PN) collision.

18. A wireless apparatus comprising:
means for receiving a first identifier during at least one time slot, the first identifier identifying a first communication node;
means for determining if the first identifier is received during a first time slot that is different from at least one pre-assigned time slot;
means for determining if the first identifier identifying the first communication node is the same as a second identifier identifying a second communication node, the second identifier being received during the same first time slot; and
means for transmitting a first message to a third communication node if the first identifier is the same as the second identifier and if the first time slot is different from the at least one pre-assigned time slot, wherein the third communication node is further configured to transmit the first message to a server.

19. The apparatus of claim 18, wherein the first communication node obtains a new identifier in response to a second message, and wherein the first communication node receives the second message from the server.

20. The apparatus of claim 19, wherein the server obtains the new identifier.

21. The apparatus of claim 15, wherein the first identifier comprises a first pseudo noise offset applied to a pseudo noise short code.

22. A computer program product, comprising:
non-transitory computer-readable medium comprising:
code for causing a computer to receive a first identifier during at least one time slot, the first identifier identifying a first remote communication node;
code for causing the computer to determine, at a wireless entity, if the first identifier identifying the first remote communication node is received during a first time slot that is different from at least one pre-assigned time slot;
code for causing the computer to determine if the first identifier identifying the first remote communication node is the same as a second identifier identifying a second remote communication node, the second identifier being received during the same first time slot; and
code for causing a computer to transmit a message to the first remote communication node if the first identifier is the same as the second identifier and if the first time slot is different from the at least one pre-assigned time slot, wherein the first remote communication node is configured to obtain in response to the message a new identifier not previously assigned, and wherein the new identifier is different than the first identifier and the second identifier.

23. The computer program product of claim 22, wherein the at least one pre-assigned time slot comprises a sequence of time slots that is uniquely reserved for communication by the first remote communication node.

24. The computer program product of claim 22, wherein the message comprises information indicative of a pseudo noise (PN) collision.

25. A computer program product, comprising:
non-transitory computer-readable medium comprising:
code for causing a computer to receive a first identifier during at least one time slot, the first identifier identifying a first communication node;
code for causing the computer to determine, at a wireless entity, if the first identifier identifying the first communication node is received during a first time slot that is different from at least one pre-assigned time slot;
code for causing the computer to determine if the first identifier identifying the first communication node is the same as a second identifier identifying a second communication node, the second identifier being received during the same first time slot; and
code for causing the computer to transmit a first message to a third communication node if the first identifier is the same as the second identifier and if the first time slot is different from the at least one pre-assigned time slot, wherein the third communication node is further configured to transmit the first message to a server.

26. The computer program product of claim 25, wherein the first communication node obtains a new identifier in response to a second message, and wherein the first communication node receives the second message from the server.

27. The computer program product of claim 26, wherein the server obtains the new identifier.

28. The computer program product of claim 22, wherein the first identifier comprises a first pseudo noise offset applied to a pseudo noise short code.

29. A computer program product, comprising:
non-transitory computer-readable medium comprising:
code for causing a computer to receive a first identifier during at least one time slot, the first identifier identifying a first communication node;
code for causing the computer to determine if the first identifier is received during a first time slot that is different from at least one pre-assigned time slot;
code for causing the computer to determine if the first identifier identifying the first communication node is the same as a second identifier identifying a second communication node, the second identifier being received during the same first time slot; and
code for causing the computer to transmit a first message to a third communication node if the first identifier is the same as the second identifier and if the first time slot is different from the at least one pre-assigned time slot, wherein the third communication node is further configured to transmit the first message to a server.

30. The computer program product of claim 29, wherein the first communication node obtains a new identifier in response to a second message, and wherein the first communication node receives the second message from the server.

31. The computer program product of claim 30, wherein the server obtains the new identifier.

* * * * *